United States Patent
Hoshuyama et al.

(10) Patent No.: US 11,300,671 B2
(45) Date of Patent: Apr. 12, 2022

(54) METHOD FOR REMOVING INTER-RADAR INTERFERENCE USING DECONVOLUTION OF CROSS CORRELATED REFERENCE SIGNALS, SIGNAL PROCESSING DEVICE, SIGNAL PROCESSING METHOD, AND SIGNAL PROCESSING PROGRAM

(71) Applicant: NEC Corporation, Tokyo (JP)

(72) Inventors: Osamu Hoshuyama, Tokyo (JP); Manabu Arikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 325 days.

(21) Appl. No.: 16/472,940

(22) PCT Filed: Dec. 26, 2016

(86) PCT No.: PCT/JP2016/088639
§ 371 (c)(1),
(2) Date: Jun. 24, 2019

(87) PCT Pub. No.: WO2018/122900
PCT Pub. Date: Jul. 5, 2018

(65) Prior Publication Data
US 2019/0353768 A1     Nov. 21, 2019

(51) Int. Cl.
*G01S 13/28* (2006.01)
*G01S 7/292* (2006.01)
(Continued)

(52) U.S. Cl.
CPC ............ *G01S 13/28* (2013.01); *G01S 7/023* (2013.01); *G01S 7/2927* (2013.01);
(Continued)

(58) Field of Classification Search
CPC .... G01S 13/28; G01S 13/9004; G01S 7/2927; G01S 7/4052; G01S 13/90; G01S 7/4082
See application file for complete search history.

(56) References Cited

U.S. PATENT DOCUMENTS

| | | | |
|---|---|---|---|
| 4,723,294 A | 2/1988 | Taguchi | |
| 6,272,440 B1 * | 8/2001 | Shakespeare | ............ G01J 3/46 250/559.04 |

(Continued)

FOREIGN PATENT DOCUMENTS

| | | |
|---|---|---|
| JP | 62-135020 A | 6/1987 |
| JP | 11-88230 A | 3/1999 |

(Continued)

OTHER PUBLICATIONS

Alberto Moreira et al., "A Tutorial on Synthetic Aperture Radar," IEEE Geoscience and Remote Sensing Magazine, vol. 1, No. 1, Mar. 2013, pp. 6-43, 38 pages total.

(Continued)

*Primary Examiner* — Donald H B Braswell

(57) ABSTRACT

The present invention is a signal processing device that efficiently removes multiple types of interference waves mixed in with a received signal. This signal processing device is provided with: a first extraction unit that performs deconvolution with respect to a cross-correlation of a reference signal and a received signal and to an autocorrelation of the reference signal, and extracts a channel response to the reference signal; a second extraction unit that extracts a main channel response corresponding to the reference signal from the channel response; and a removal unit that restores a signal by performing convolution with respect to the reference signal and the main channel response, and removes the restored signal from the received signal.

12 Claims, 20 Drawing Sheets

(51) Int. Cl.
*G01S 7/40* (2006.01)
*G01S 13/90* (2006.01)
*G01S 7/02* (2006.01)

(52) U.S. Cl.
CPC ............ *G01S 7/4052* (2013.01); *G01S 13/90* (2013.01); *G01S 13/9004* (2019.05); *G01S 7/4082* (2021.05)

(56) References Cited

U.S. PATENT DOCUMENTS

| | | | | |
|---|---|---|---|---|
| 6,781,540 | B1* | 8/2004 | MacKey | G01S 13/90 342/188 |
| 2009/0095912 | A1* | 4/2009 | Slinger | G06T 1/0007 250/363.06 |
| 2011/0105930 | A1* | 5/2011 | Thiagarajan | A61B 5/316 600/523 |
| 2016/0148400 | A1* | 5/2016 | Bajic | G06T 9/00 382/304 |

FOREIGN PATENT DOCUMENTS

| | | |
|---|---|---|
| JP | 2009-58308 A | 3/2009 |
| JP | 2011-98198 A | 5/2011 |

OTHER PUBLICATIONS

Wen-Qin Wang, "MIMO SAR OFDM Chirp Waveform Diversity Design With Random Matrix Modulation", IEEE Transactions on Geoscience and Remote Sensing, vol. 53, No. 3, Mar. 2015, pp. 1615-1625, 11 pages total.
Haneda, "Acoustic Echo Canceler", The Institute of Electronics, Information and Communication Engineers, "Knowledge Forest", Group 2, vol. 6, Chapter 5, 2012, URL: http://www.ieice-hbkb.org, 17 pages total.
International Search Report dated Apr. 4, 2017 issued by the International Searching Authority in International Application No. PCT/JP2016/088639.
Written Opinion dated Apr. 4, 2017 issued by the International Searching Authority in International Application No. PCT/JP2016/088639.

* cited by examiner

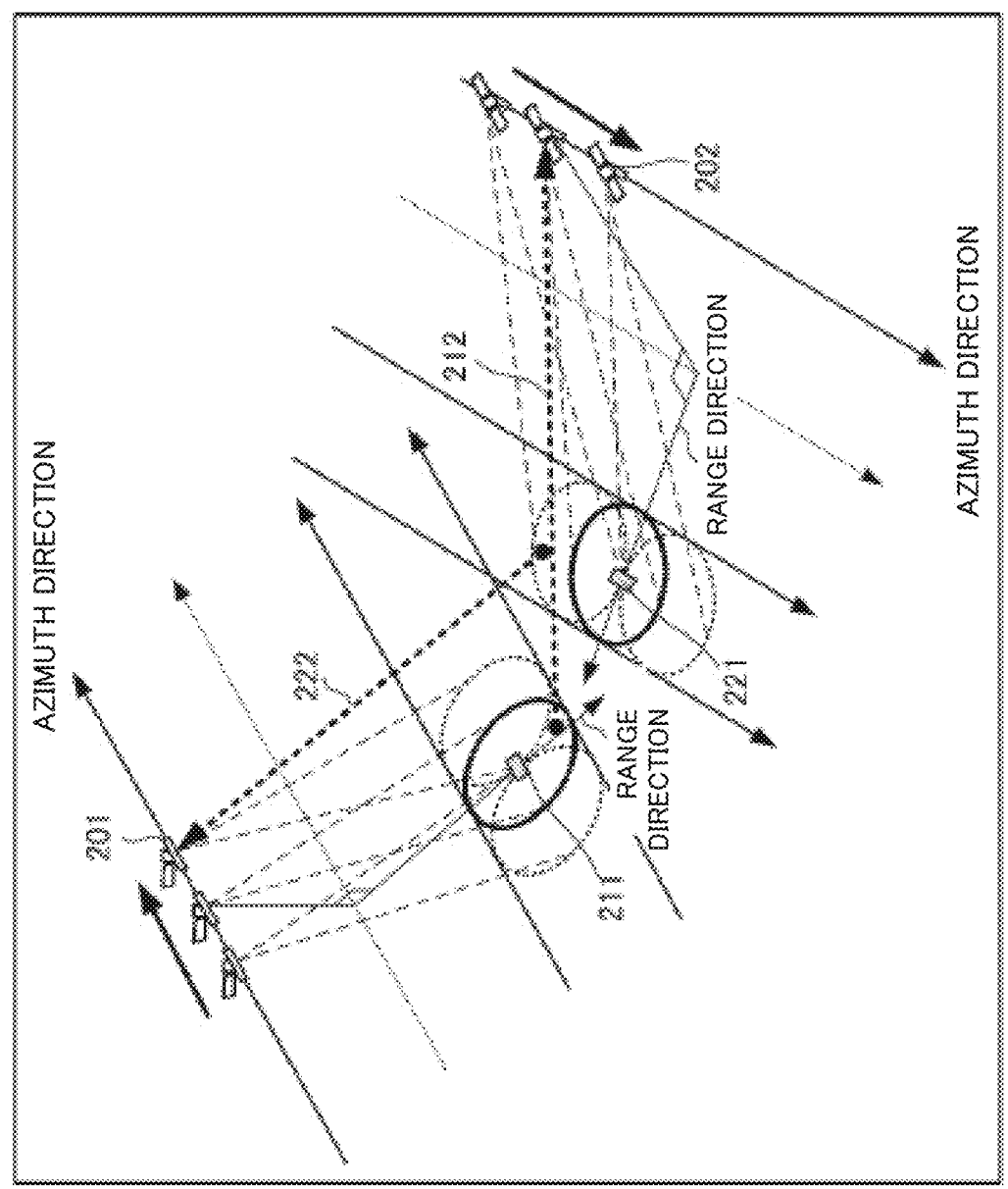
Fig. 2
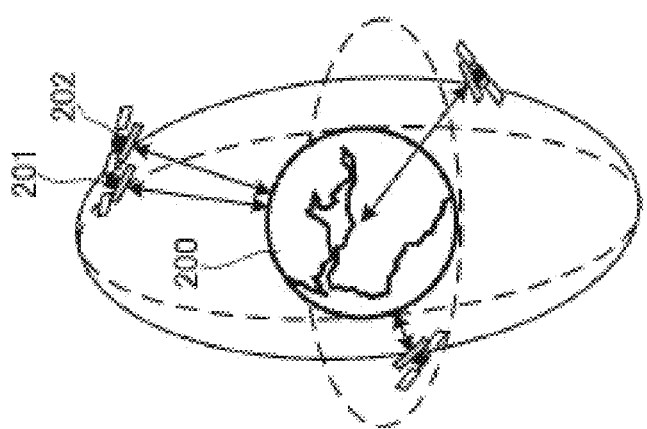

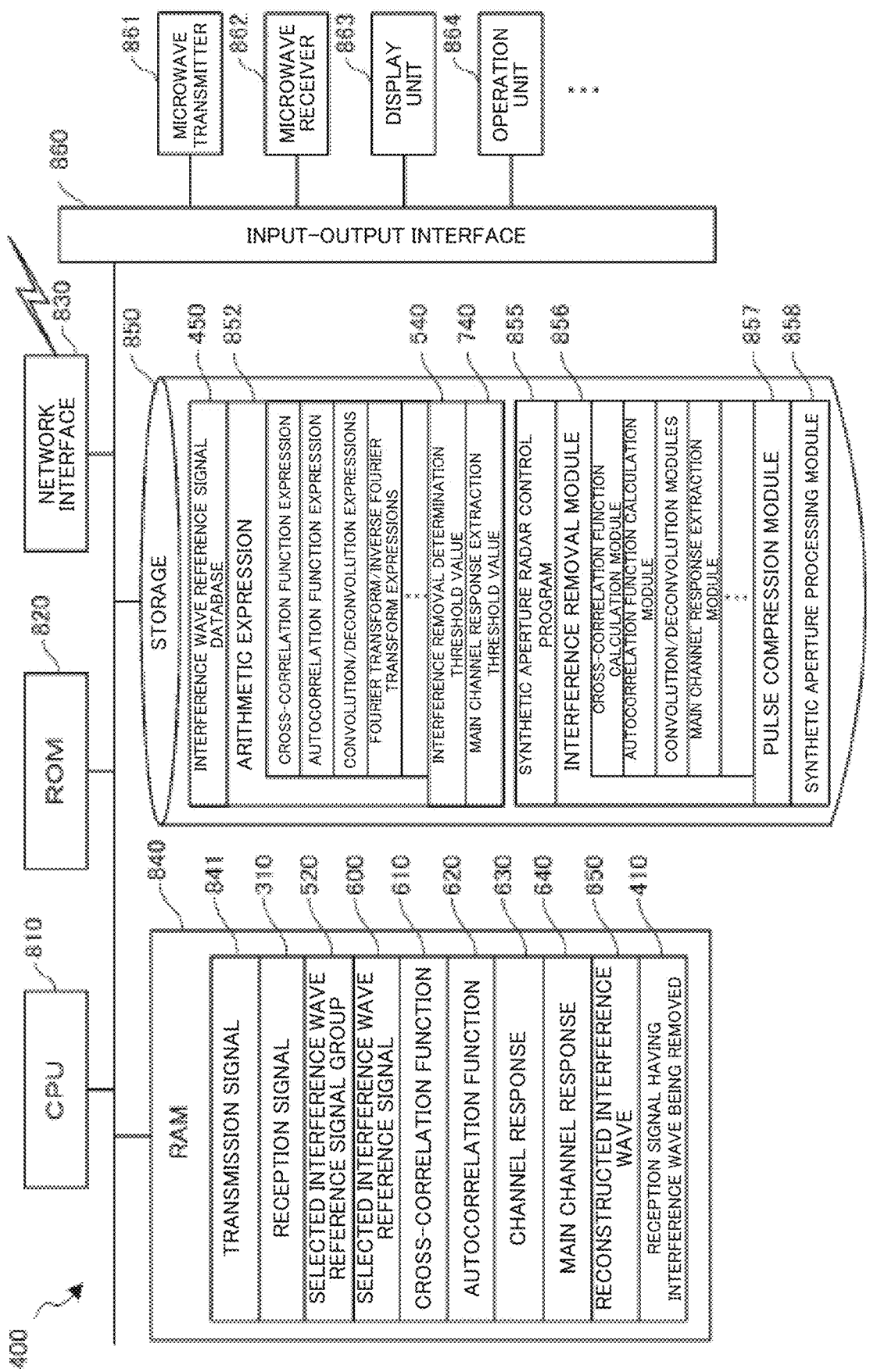

METHOD FOR REMOVING INTER-RADAR INTERFERENCE USING DECONVOLUTION OF CROSS CORRELATED REFERENCE SIGNALS, SIGNAL PROCESSING DEVICE, SIGNAL PROCESSING METHOD, AND SIGNAL PROCESSING PROGRAM

TECHNICAL FIELD

The present invention relates to a method for removing inter-radar interference, a signal processing device, a signal processing method, and a signal processing program.

BACKGROUND ART

In the above-described technical field, NPL 1 discloses a synthetic aperture radar including pulse compression processing and synthetic aperture processing. In the pulse compression processing, a cross-correlation of a reception signal and a sent pulse (range reference signal) is acquired, pulse compression is performed, and a resolution in a range direction is increased. Then, in the synthetic aperture processing, a cross-correlation of a signal subjected to pulse compression and an azimuth reference signal varying depending on a range distance is acquired, and a resolution in an azimuth direction is increased. Further, PTL 1 describes an interference wave removal method of identifying a frequency domain in which presence of an interference wave is conjectured from comparison between a frequency spectrum of a reception signal and a frequency spectrum of a sent reference signal, and masking the frequency domain. Further, NPL 2 describes a technique for avoiding interference in which each of radar systems uses a send pattern orthogonal to each other like an orthogonal frequency division multiplexing (OFDM) chirp.

CITATION LIST

Patent Literature

[PTL 1] Japanese Unexamined Patent Application Publication No. 2009-058308

Non Patent Literature

[NPL 1] A. Moreira et al., "A Tutorial on Synthetic Aperture Radar," IEEE Geoscience and Remote Sensing Magazine 1(1), 6(2013).

[NPL 2] W.-Q. Wang, "MIMO SAR OFDM Chirp Waveform Diversity Design With Random Matrix Modulation," IEEE Trans. on Geoscience and Remote Sensing 53(3), 1615(2015).

[NPL 3] Haneda, "Acoustic Echo Canceler", The Institute of Electronics, Information and Communication Engineers, "Knowledge Forest", Group 2, Volume 6, and Chapter 5 (http://www.ieice-hbkb.org/).

SUMMARY OF INVENTION

Technical Problem

However, a sufficient effect cannot be acquired from a measure by the techniques described in the above-described documents, and variety of interference waves mixed in a reception signal cannot be efficiently removed.

An object of the present invention is to provide a technique that solves the above-described problem.

Solution to Problem

In order to achieve the object described above, a signal processing device, according to the present invention, includes: first extraction means for performing deconvolution on a cross-correlation function of a reference signal and a reception signal, and an autocorrelation function of the reference signal, and extracting a channel response to the reference signal; second extraction means for extracting a main channel response associated with the reference signal from the channel response; and removal means for reconstructing a signal by performing convolution on the reference signal and the main channel response, and removing the reconstructed signal from the reception signal.

In order to achieve the object described above, a signal processing method, according to the present invention, includes: a first extraction step of performing deconvolution on a cross-correlation function of a reference signal and a reception signal, and an autocorrelation function of the reference signal, and extracting a channel response to the reference signal; a second extraction step of extracting a main channel response associated with the reference signal from the channel response; and a removal step of reconstructing a signal by performing convolution on the reference signal and the main channel response, and removing the reconstructed signal from the reception signal.

In order to achieve the object described above, a signal processing program, according to the present invention, causes a computer to execute: an extraction step of performing deconvolution on a cross-correlation function of a reference signal and a reception signal, and an autocorrelation function of the reference signal, and extracting a channel response to the reference signal; a second extraction step of extracting a main channel response associated with the reference signal from the channel response; and a removal step of reconstructing a signal by performing convolution on the reference signal and the main channel response, and removing the reconstructed signal from the reception signal.

In order to achieve the object described above, a method of removing an inter-radar interference, according to the present invention, the method includes: a cross-correlation step of calculating a cross-correlation function of each of a plurality of reference signals and a reception signal; an autocorrelation step of calculating an autocorrelation function of the plurality of reference signals; a first extraction step of performing deconvolution on the cross-correlation function and the autocorrelation function, and extracting a plurality of channel responses to the plurality of respective reference signals; a second extraction step of extracting a main channel response in which intensity of the plurality of channel responses exceeds a threshold value; a reconstruction step of reconstructing a signal by performing convolution on the reference signal and the main channel response; a removal step of removing the reconstructed signal from the reception signal; and a control step of performing control in such a way that each of the above-described steps is repeatedly performed on each reference signal of a predetermined reference signal group.

Advantageous Effects of Invention

According to the present invention, variety of interference waves mixed in a reception signal can be efficiently removed.

BRIEF DESCRIPTION OF DRAWINGS

FIG. 2 is a diagram for describing an environment to which a signal processing device according to a second example embodiment of the present invention is applied.

FIG. 8A is a block diagram illustrating a hardware configuration of the signal processing device according to the second example embodiment of the present invention.

EXAMPLE EMBODIMENT

Hereinafter, example embodiments of the present invention are exemplarily described in detail with reference to the drawings. However, a structural component described in the example embodiments below is merely an exemplification, and a technical scope of the present invention is not intended to be limited to the structural component.

First Example Embodiment

Figure 1:
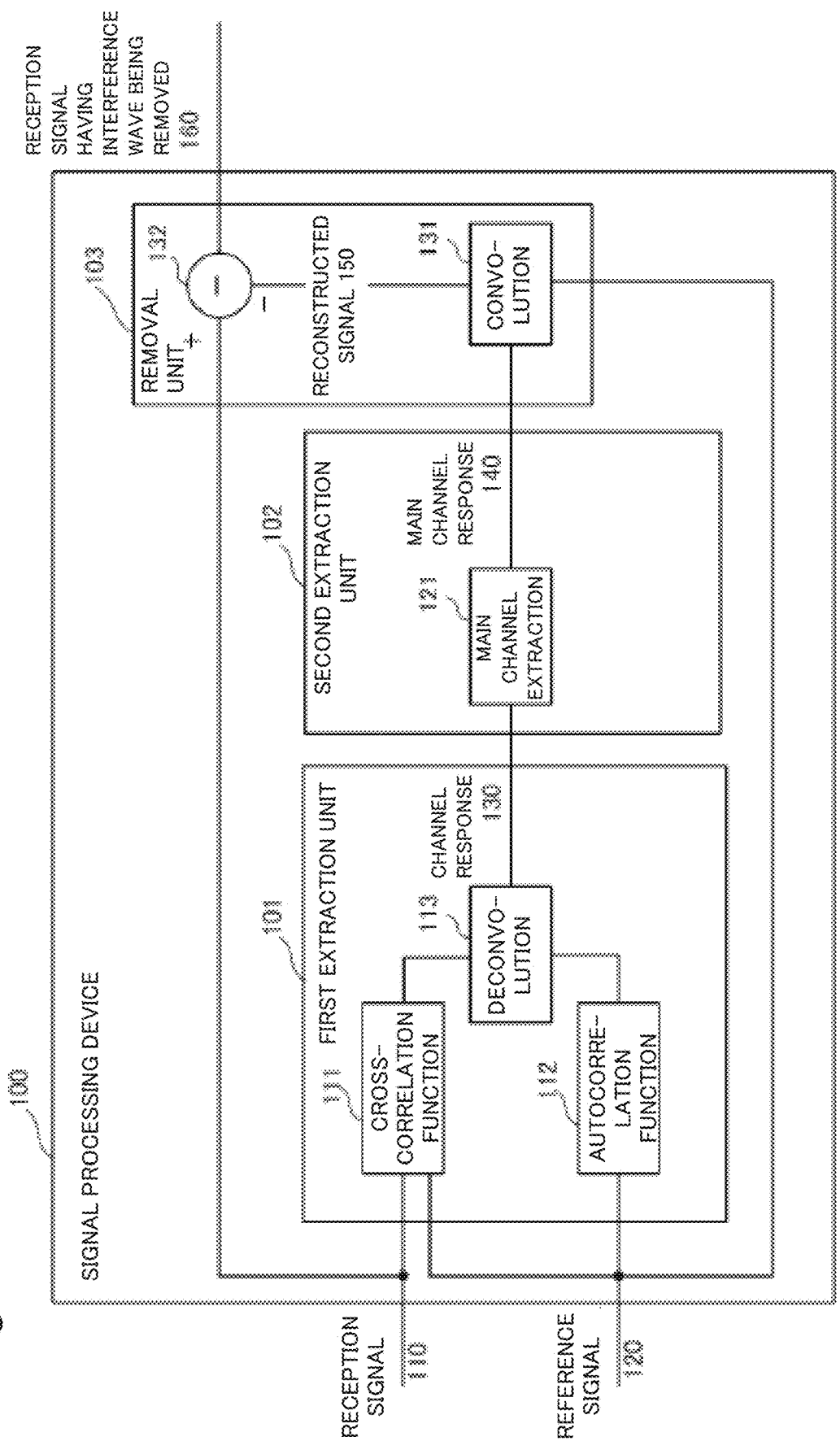
FIG. 1 is a block diagram illustrating a configuration of a signal processing device according to a first example embodiment of the present invention.

A signal processing device 100 as a first example embodiment of the present invention is described by using FIG. 1. The signal processing device 100 is a device that removes an interference wave from a reception signal.

As illustrated in FIG. 1, the signal processing device 100 includes a first extraction unit 101, a second extraction unit 102, and a removal unit 103. The first extraction unit 101 performs deconvolution 113 on a cross-correlation function 111 of a reference signal 120 and a reception signal 110 and on an autocorrelation function 112 of the reference signal 120, and then extracts a channel response 130 to the reference signal 120. The second extraction unit 102 extracts 121 a main channel response 140 associated with the reference signal 120 from the channel response 130. The removal unit 103 reconstructs a signal 150 by performing convolution 131 on the reference signal 120 and the main channel response 140, and removes 132 the reconstructed signal 150 from the reception signal 110.

According to the present example embodiment, a channel response is extracted by performing deconvolution on a cross-correlation function of a reference signal and a reception signal and on an autocorrelation function of the reference signal. Then, a main channel response associated with the reference signal is extracted from the channel response, and a signal reconstructed by performing convolution on the reference signal and the main channel response is removed. Thus, interference waves of many kinds mixed in the reception signal can be efficiently removed.

Second Example Embodiment

Next, a signal processing device according to a second example embodiment of the present invention is described. In the signal processing device according to the present example embodiment, as a method of removing an inter-radar interference, deconvolution is performed on a cross-correlation function of one of a plurality of reference signals and a reception signal and on an autocorrelation function of the reference signal, and then a channel response is extracted. Next, a main channel response associated with the reference signal is extracted from the channel response. Then, a signal is reconstructed by performing convolution on the main channel response and the reference signal, and the reconstructed signal is removed from the reception signal. The processing is repeatedly performed for a plurality of times on each reference signal of a reference signal group formed of a plurality of reference signals. Thus, an interference wave included in the reception signal is removed.

Further, in the signal processing device according to the present example embodiment, a reference signal group formed of a plurality of reference signals includes a reference signal to be a candidate for an interference wave included in a reception signal, and the reception signal having the interference wave being removed is output after extraction of a channel response, extraction of a main channel response, and removal of a reconstructed signal are repeatedly performed on each reference signal of the reference signal group. Further, the signal processing device according to the present example embodiment selects a desired reference signal group, and reselects a reference signal group when an interference wave is not sufficiently removed from a reception signal having the interference wave being removed. Further, a component in which intensity in a time domain of deconvolution performed on a cross-correlation function of each reference signal of a reference signal group and a reception signal and on an autocorrelation function of each reference signal exceeds a threshold value provided according to a noise level is extracted as a main channel response. A Wiener filter is used for the deconvolution. Furthermore, the signal processing device according to the present example embodiment may include a transmission unit that transmits a chirped pulse having a frequency changing in terms of time.

<<Prerequisite Technique>>

First, a prerequisite technique according to the present example embodiment and a problem of the prerequisite technique are described to clarify a characteristic of the present example embodiment.

Expectations are rising for remote sensing that observes the ground from a flying object in the air including an artificial satellite and is used for disaster monitoring and large-scale farming. Ground observation by a radar technique using a radio wave enables active observation without being affected by weather and day and night, and is an important technique. Particularly, a synthetic aperture radar that synthesizes observation data for each send pulse of a moving radar platform by synthetic aperture processing can be considered to use a virtually large aperture, and can thus achieve high-resolution observation. Accordingly, high expectations are concentrated on the synthetic aperture radar.

Figure 3:
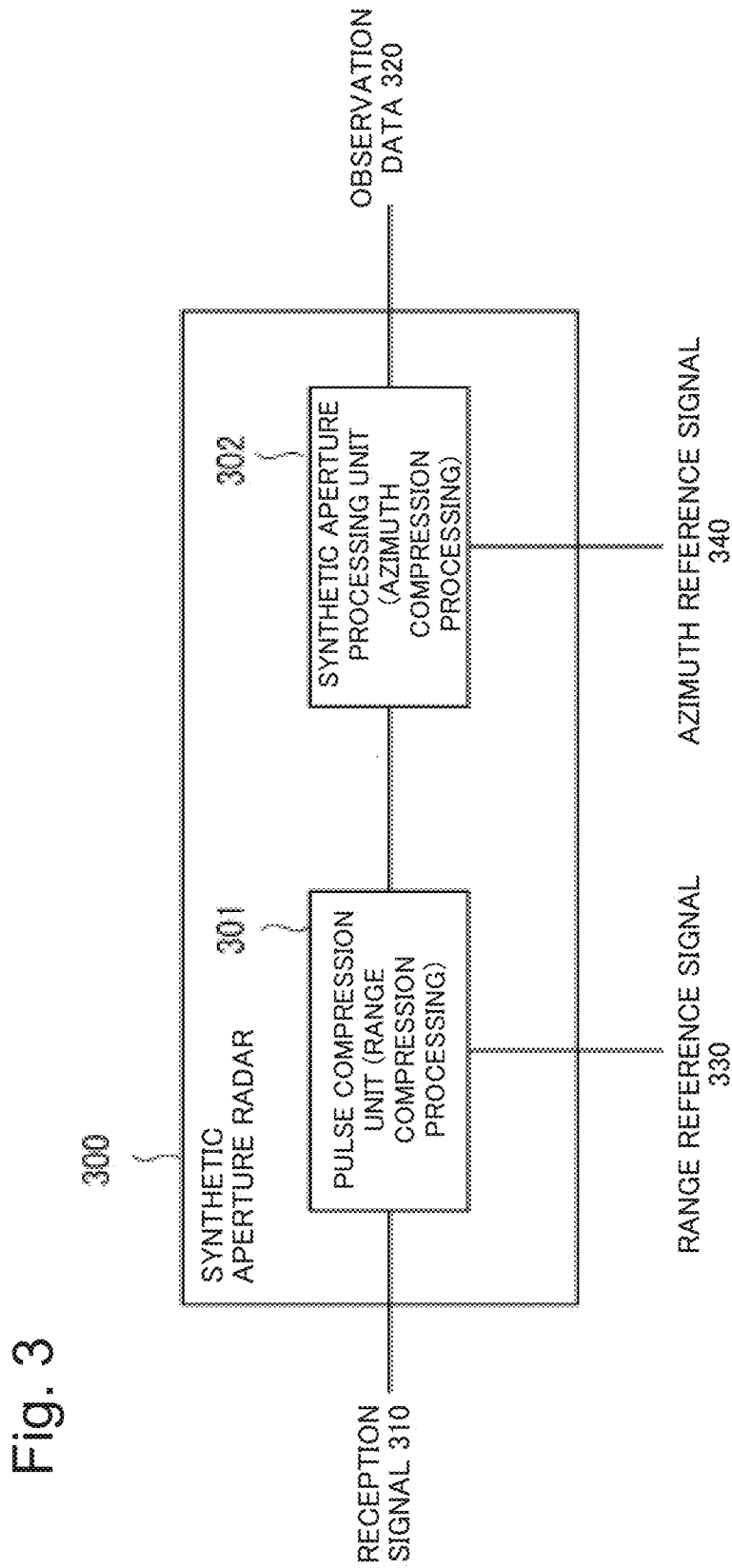
FIG. 3 is a block diagram illustrating a configuration of a signal processing device according to a prerequisite technique.

FIG. 3 illustrates a block diagram illustrating a configuration of a signal processing device being a general synthetic aperture radar. As described in NPL 1, a moving radar platform sends a chirped pulse having an instantaneous frequency changing in terms of time, and receives a signal reflected by an object. In order to acquire high-resolution observation data from this acquired reception signal 310, signal processing is performed by a pulse compression unit 301 that performs range compression processing and a synthetic aperture processing unit 302 that performs azimuth compression processing. In the pulse compression unit 301, a cross-correlation of the reception signal 310 and a sent pulse (range reference signal 330) is calculated, pulse compression is thus performed, and thereby a resolution in the range direction is thus increased by concentrating a signal in a narrow time width in a range direction. In the synthetic aperture processing unit 302, a cross-correlation of the signal subjected to the pulse compression and an azimuth reference signal 340 varying depending on a range distance is calculated, and a resolution in an azimuth direction is increased. A high-resolution image is generated by a series of the processing normally performed digitally and is output as observation data 320.

Meanwhile, an opportunity for effective utilization of an outer space is increasing, and the number of launched artificial satellites is also increasing steadily in recent years. Many radar satellites will be launched in the future, and it is assumed that a plurality of radar systems are simultaneously operated in a close space. In such a case, a problem of an inter-radar interference arises in such a way that a signal from another radar system is mixed in a certain radar system.

In other words, when a radar system being an object sends a signal and receives reflection from an observed object, a signal sent from a different radar system may reach the radar system being the object due to some sort of reflection body and the like, become an interference wave, and be received. Herein, the interference represents unintended reception of a signal sent from a radar system other than a radar system being an object by the radar system being the object, and a transmission characteristic received until a signal sent from a certain radar system is received by the radar system being the object is referred to as a channel response to the signal.

The following methods are conceivable in such a way that a plurality of radar systems being operated in the vicinity do not interfere with each other. The first method is that different radar systems use different frequency bands. When a mixed interference wave from another radar can be distinguished by a frequency, only the interference wave can be removed by frequency filtering. However, in this case, a usable frequency band is divided and used by a plurality of radar systems, and thus a frequency band assigned to each of the radar systems is narrow. Since a use of a send pattern having a wide frequency band such as a chirped pulse is needed for high resolution by pulse compression, this measure deteriorates resolution. Alternatively, when overlapping of a frequency band used by a plurality of radar systems is allowed, deteriorated resolution is avoided, but an effect of removing an interference wave decreases. PTL 1 describes the interference wave removal method of identifying a frequency domain in which presence of an interference wave is conjectured from comparison between a frequency spectrum of a reception signal and a frequency spectrum of a sent reference signal, and masking the conjectured frequency domain.

The second method is to use each send pattern to be orthogonal each other by different radar systems as in an orthogonal frequency division multiplexing (OFDM) chirp described in NPL 2.

Examples of another method of directly removing an interference wave from a reception signal include an adaptive filter typified by an acoustic echo canceler described in NPL 3. When the acoustic echo canceler is applied to inter-radar interference removal, a plurality of radars use different send patterns (reference signals), identification of a channel response and reconstruction of an interference wave are performed by an adaptive filter applied to a reference signal, and interference removal is performed using the identified channel response and the reconstructed interference wave. This is a configuration for removing an interference wave from a reception signal when the reception signal includes a main signal component resulting from a certain reference signal A and an interference wave component resulting from another reference signal B. The reference signals A and B are each an input to a finite impulse response (FIR) filter, and adaptive control is performed on a filter coefficient of the FIR filter with a difference between a sum of outputs thereof and the reception signal as an error signal. A least mean square (LMS) algorithm and the like are used for the coefficient control. When a feedback loop of the adaptive control in such a way as to minimize magnitude of the error signal properly converges, a response of each FIR filter coincides with a channel response to the reference signal A sent from a main radar and a channel response to the reference signal B sent from a different radar. The outputs of these FIR filters respectively become a main signal and an interference wave included in the reception signal.

<<Problem of Prerequisite Technique>>

A main signal having a frequency spectrum in a wide band and an interference wave in a narrow band close to a line spectrum are premises in the technique of PTL 1, and thus the technique is not applicable as it is to interference removal between a plurality of radars.

Further, in the technique of NPL 2, a group of send patterns having a wide frequency band and orthogonal to each other in a limited frequency band is limited, and it is also difficult to maintain orthogonality under any relative delay. Therefore, the number of radar systems that can be simultaneously operated by this measure alone is extremely limited.

Further, a problem arises when the technique of NPL 3 is applied as it is to a synthetic aperture radar. The synthetic aperture radar is used on premises of pulse compression and synthetic aperture processing, and thus a raw reception signal before being subjected to these often has an extremely low signal-to-noise ratio. In a case of such a high noise, a feedback loop of adaptive control does not operate well.

<<Signal Processing Device of Present Example Embodiment>>

A configuration and an operation of the signal processing device according to the present example embodiment are described below in detail with reference to FIGS. 2 to 9B.

<<Operating Environment>>

FIG. 2 is a diagram for describing an environment to which a signal processing device according to the present example embodiment is applied. In FIG. 2, an example in which the signal processing device according to the present example embodiment is applied for generating an image of the ground by one or a plurality of synthetic aperture radars installed on an artificial satellite is described.

The left diagram in FIG. 2 illustrates artificial satellites 201 and 202 that circle the earth 200. The right diagram in FIG. 2 illustrates a state where an image of the ground is generated by a synthetic aperture radar installed on each of the artificial satellites 201 and 202.

It is assumed that the artificial satellite 201 flies in a thick arrow direction and observes a ground observation point 211. It is assumed that the artificial satellite 202 flies in a thick arrow direction and observes a ground observation point 221. While each of the artificial satellites 201 and 202 flies in the thick arrow direction, each of the artificial satellites 201 and 202 continuously transmits a chirped pulse, synthesizes a reflection signal thereof, and generates observation data of the ground observation points 211 and 221. Thus, precise observation of the artificial satellites 201 and 202 by the aperture radar extending in the fling direction can be achieved.

Herein, for example, a signal 222 that is transmitted from the synthetic aperture radar of the artificial satellite 202 other than a signal transmitted from the synthetic aperture radar of the artificial satellite 201 itself and is then reflected is mixed as an interference wave in the synthetic aperture radar of the artificial satellite 201. Further, a signal 212 that is transmitted from the synthetic aperture radar of the artificial satellite 201 other than a signal transmitted from the synthetic aperture radar of the artificial satellite 202 itself and is then reflected is mixed as an interference wave in the synthetic aperture radar of the artificial satellite 202. More artificial satellites including a synthetic aperture radar in the vicinity further increase an interference wave.

The present example embodiment is a configuration for efficiently removing an interference wave generated based on a transmission signal from a known synthetic aperture radar installed on an artificial satellite in such a manner.

<<Functional Configuration of Signal Processing Device>>

Figure 4:
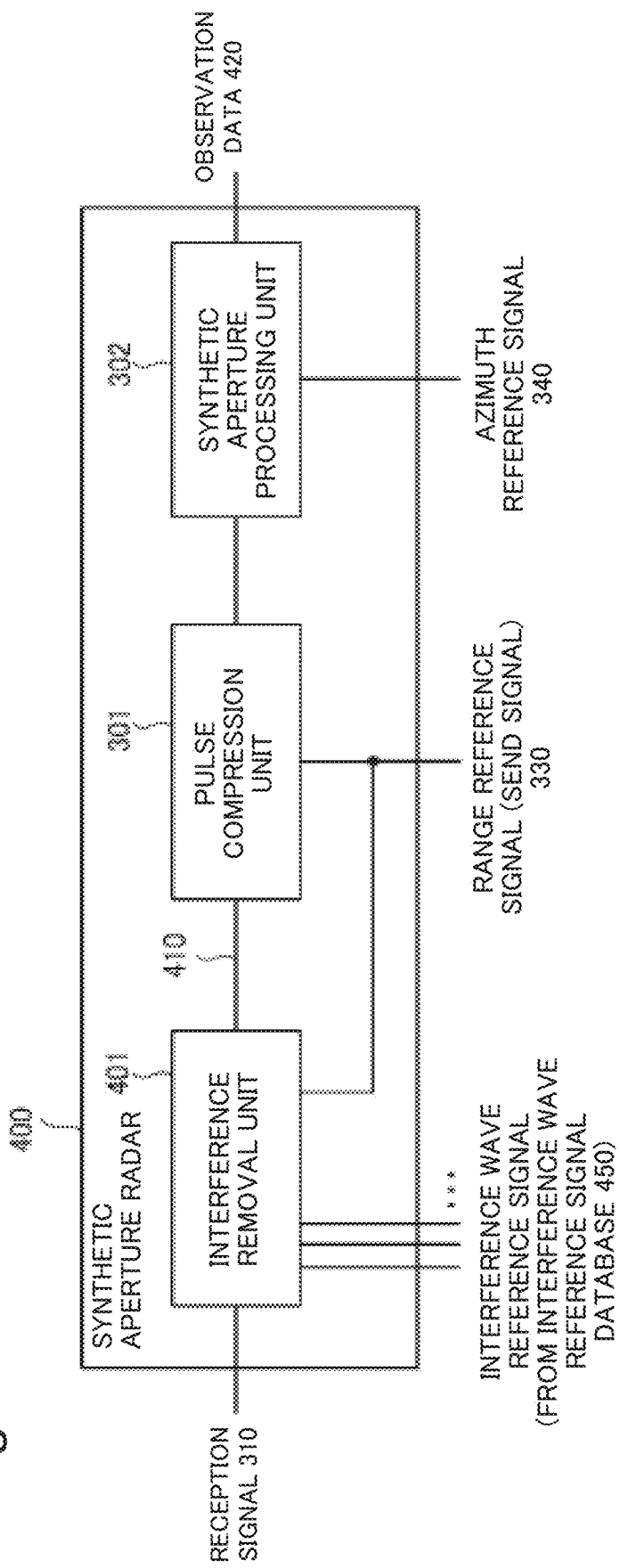
FIG. 4 is a block diagram illustrating a functional configuration of the signal processing device according to the second example embodiment of the present invention.

FIG. 4 is a block diagram illustrating a functional configuration of a signal processing device 400 according to the present example embodiment. FIG. 4 is a configuration of synthetic aperture radar-reception digital signal processing including interference removal processing as the signal processing device 400.

A reception signal 310 is a digital signal acquired by down-converting a received signal, converting the received signal to a base band, and sampling the base band at an appropriate frequency. The reception signal 310 is input to an interference removal unit 401 together with an interference wave reference signal i (i=2, . . . , and N) and a range reference signal (reference signal 1), and a reception signal 410 on which interference removal has been performed is output. Subsequently, similarly to the reception processing of the regular synthetic aperture radar illustrated in FIG. 3, range compression processing of a pulse compression unit 301 and azimuth compression processing of a synthetic aperture processing unit 302 are performed. Then, observation data 420 generated based on the reception signal 410 from which variety of interference waves mixed in the reception signal are efficiently removed are output from the synthetic aperture processing unit 302.

Hereinafter, a case where N synthetic aperture radars are simultaneously operated and each interference generated between them is removed is described as an example in the present example embodiment. It is assumed that each of the radars is a radar i (i=1, . . . , and N), and a send pattern used in the radar i is a reference signal i. Interference removal processing on a reception signal of a radar i=1 is described. Herein, it is assumed that the reference signal i is, for example, a chirped pulse at a different chirped rate, and the radar i=1 knows reference signals used by all of the other radars. Information about this reference signal is not necessarily acquired by an individual radar, but it is assumed that the information is held as a database from disclosed information related to an operating artificial satellite. When a difference in reference signal being used is only a mere difference in chirped rate, a reference signal of an interference wave mixed in a reception signal can also be estimated by previously detecting magnitude of a cross-correlation of the reception signal of the radar i=1 and the chirped pulse while sweeping the chirped rate. Further, under a condition that the reference signal is known, the present example embodiment is also applicable not only to interference removal between a plurality of radars but also to interference removal generated between different chirped pulses sent from the same radar at different timings.

(Interference Removal Unit)

Figure 5:
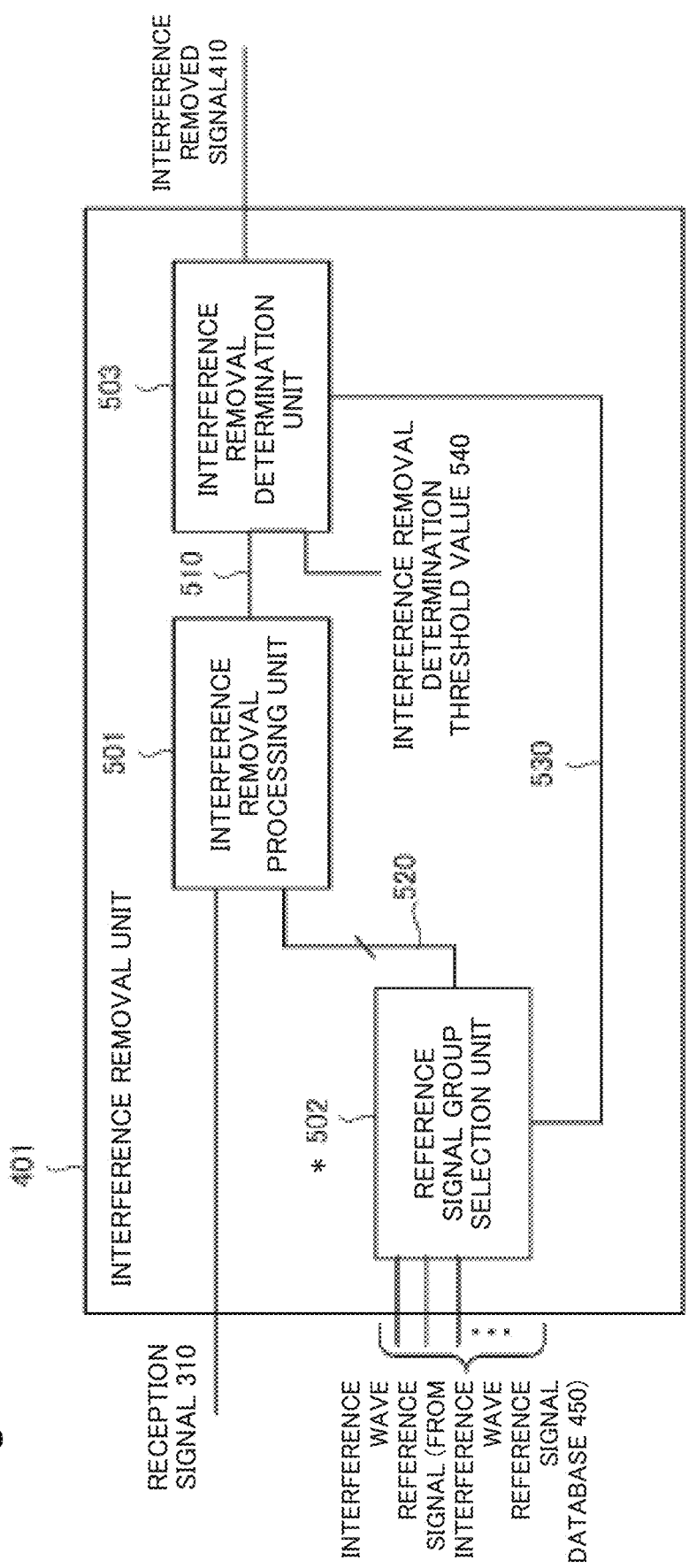
FIG. 5 is a block diagram illustrating a functional configuration of an interference removal unit according to the second example embodiment of the present invention.

FIG. 5 is a block diagram illustrating a functional configuration of the interference removal unit 401 according to the present example embodiment.

The interference removal unit 401 includes an interference removal processing unit 501, a reference signal group selection unit 502, and an interference removal determination unit 503.

The interference removal processing unit 501 reconstructs an interference wave, based on the reception signal 310 and an interference wave reference signal group 520 selected by the reference signal group selection unit 502, and outputs a signal 510 acquired by subtracting the reconstructed interference wave from the reception signal. The reference signal group selection unit 502 selects the interference signal group 520 from the interference wave reference signal of an interference wave reference signal database 450. Then, when the reference signal group selection unit 502 receives, from the interference removal determination unit 503, an interference wave removal determination signal 530 in which removal of an interference wave is insufficient, the reference signal group selection unit 502 reselects the interference wave reference signal group 520. The interference removal determination unit 503 determines whether or not an interference wave included in the signal 510 output from the interference removal processing unit 501 exceeds an interference removal determination threshold value 540, that is, whether or not removal of the interference wave is sufficient. Then, when the removal of the interference wave is sufficient, the signal 510 output from the interference removal processing unit 501 is output as an interference removed signal 410. On the other hand, when the removal of the interference wave is insufficient, the interference wave removal determination signal 530 is output to the reference signal group selection unit 502.

(Interference Removal Processing Unit)

Figure 6:
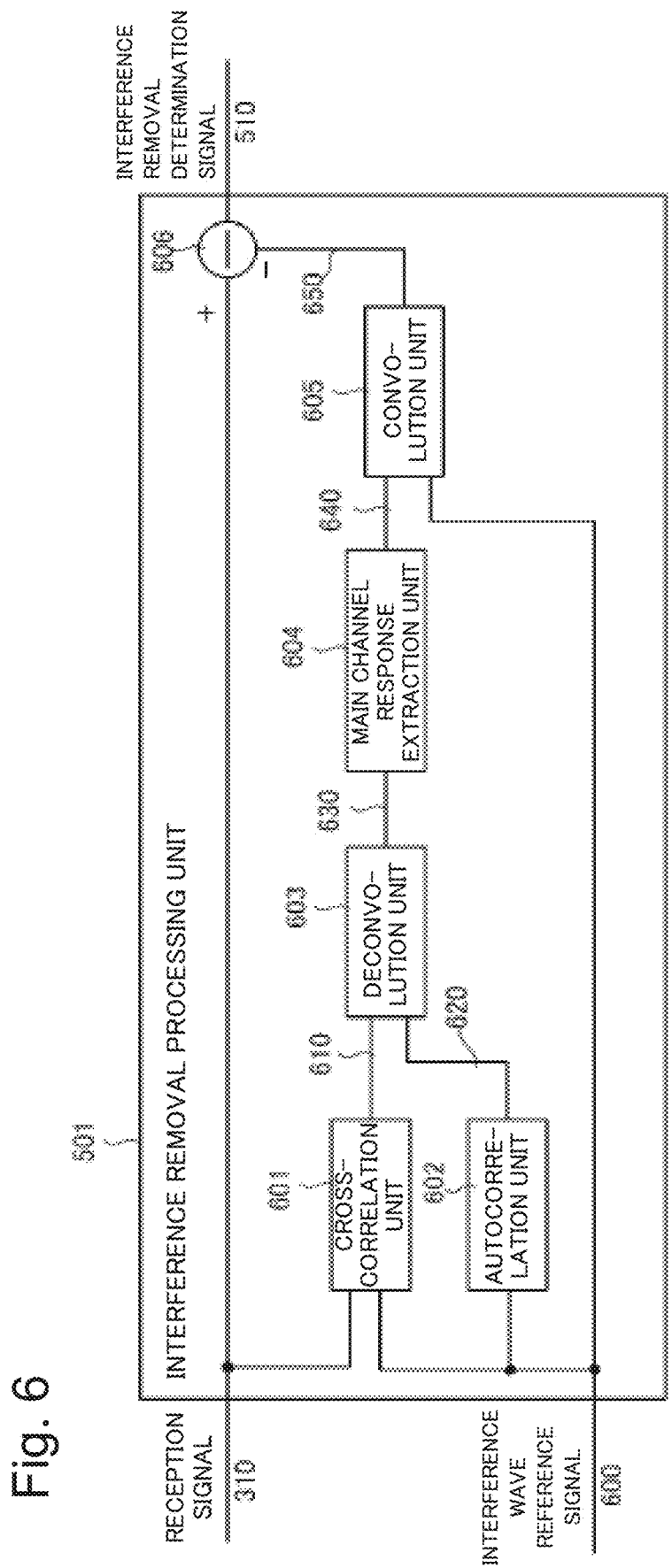
FIG. 6 is a block diagram illustrating a functional configuration of an interference removal processing unit according to the second example embodiment of the present invention.

FIG. 6 is a block diagram illustrating a functional configuration of the interference removal processing unit 501 according to the present example embodiment. FIG. 6 illustrates a basic configuration for removing an interference wave resulting from the reference signal i from the reception signal 310.

(Cross-correlation Unit 601/Autocorrelation Unit 602)

First, a cross-correlation function 610 of a reception signal y(t) and a reference signal xi(t) is calculated in a cross-correlation unit 601. The cross-correlation function is expressed by (Equation 1).

[Mathematical 1]

$$z(t) = \int_T d\tau \, y(\tau) x_i^*(\tau - t) \qquad \text{(Formula 1)}$$

In a case where there is no interference wave and noise, the reception signal is expressed as a channel response h(t) by (Equation 2).

[Mathematical 2]

$$y(t) = \int_T d\tau \, h(\tau) x_i(t - \tau) \qquad \text{(Formula 2)}$$

Therefore, the cross-correlation function z(t) is expressed as in (Equation 3).

[Mathematical 3]

$$z(t) = \int_T d\tau \, h(\tau) c_{x_i x_i}(t - \tau) \qquad \text{(Formula 3)}$$

In other words, the cross-correlation function 610 of the reception signal and the reference signal i is acquired by performing convolution on a channel response 630 and an autocorrelation function 620 (c(xi xi)(t)) of the reference signal i.

Therefore, the channel response 630 (h(t)) to the reference signal i being a target of interest can be acquired by performing deconvolution on the autocorrelation function 620 (c(xi xi)(t)) calculated in an autocorrelation unit 602 to the cross-correlation function 610 of the reception signal and the reference signal i.

A frequency domain expression of z(t) including a noise is expressed as in (Equation 4).

[Mathematical 4]

$$Z(\omega) = H(\omega) C_{x_i x_i}(\omega) + N \qquad \text{(Formula 4)}$$

(Deconvolution Unit 603)

An estimated channel response $\tilde{H}(\omega)$ is acquired by performing deconvolution in a deconvolution unit 603. All the processing up to here can be performed in a frequency domain. $\tilde{H}(\omega)$ is converted to a time domain by an inverse Fourier transform, and a time domain expression $\tilde{h}(t)$ thereof is acquired. The channel response 630 is input to a main channel response extraction unit 604, the channel response 630 being estimated by performing deconvolution on the cross-correlation function 610 of the reception signal and the reference signal i and the autocorrelation function 620 of the reference signal i.

Wiener deconvolution may be used as a method of deconvolution. The deconvolution using a Wiener deconvolution filter is expressed as in (Equation 5).

[Mathematical 5]

$$\tilde{H}(\omega) = M(\omega) Z(\omega) \qquad \text{(Formula 5)}$$

The Wiener deconvolution filter is expressed as in (Equation 6).

[Mathematical 6]

$$M(\omega) = \frac{C^*_{x_i x_i}(\omega)}{|C_{x_i x_i}(\omega)|^2 + P_N(\omega)/P_S(\omega)} \qquad \text{(Formula 6)}$$

$P_N$ and $P_S$ are respectively a power spectrum density of a noise component and a power spectrum density of h(t), but these cannot be usually acquired, and are thus approximated appropriately as in (Equation 7).

[Mathematical 7]

$$\frac{P_N}{P_S} \sim \frac{\langle |Z|^2 \rangle}{|C_{x_i x_i}|^2} \qquad \text{(Formula 7)}$$

$P_N$ and $P_S$ may be replaced with a certain constant as another simpler approximation. In this way, the channel response $\tilde{H}(\omega)$ estimated by using the Wiener deconvolution filter is acquired.

(Main Channel Response Extraction Unit 604)

Figure 7A:
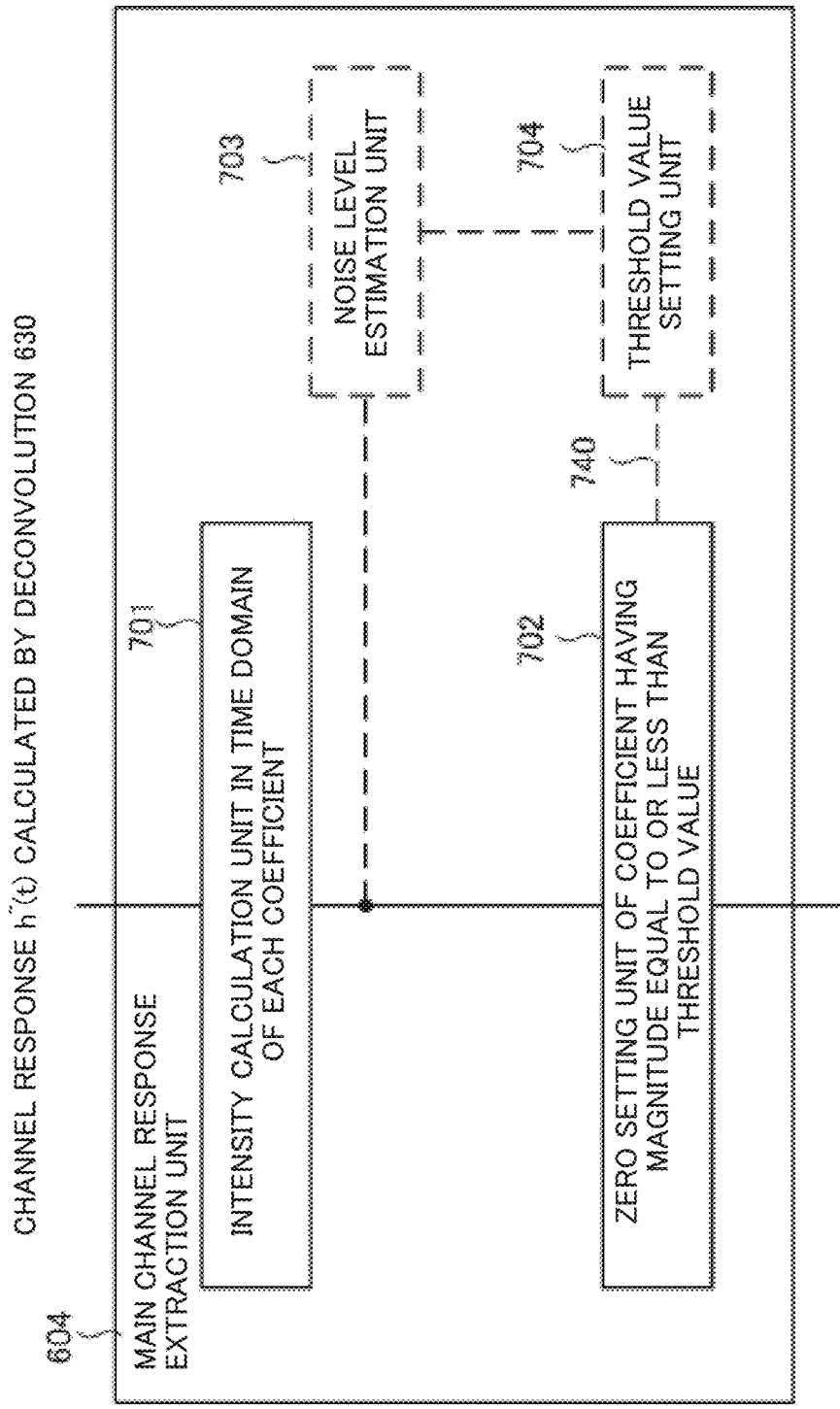
FIG. 7A is a block diagram illustrating a functional configuration of a main channel response extraction unit according to the second example embodiment of the present invention.

FIG. 7A is a block diagram illustrating a functional configuration of the main channel response extraction unit 604 according to the present example embodiment. The channel response $\tilde{h}(t)$ estimated in the deconvolution unit 603 includes a noise component other than a component resulting from a desired reference signal i, and may further include a component resulting from another reference signal. Thus, only a main channel response resulting from the desired reference signal i is extracted in the main channel response extraction unit 604.

In the main channel response extraction unit 604, first, intensity $|\tilde{h}(t)|^2$ in a time domain of the channel response 630 ($\tilde{h}(t)$) calculated by deconvolution is calculated in an intensity calculation unit 701. Next, a coefficient in which magnitude of the intensity $|\tilde{h}(t)|^2$ falls below a main channel response extraction threshold value 740 is compulsorily zero in a zero setting unit 702. In this way, only a coefficient in which a desired main channel response is dominant is extracted.

The reason is that a component resulting from a desired reference signal in a reception signal reflects a channel response received until reception of a reference signal and appears as a characteristic component concentrated in terms of time, whereas a noise component and a component resulting from another reference signal spread without being extremely concentrated in terms of time. This causes a difference in intensity in a time domain to appear, and allows the components to be distinguished from each other by an appropriate threshold value.

Note that, for a method of setting a threshold value, for example, as indicated by a dotted line in FIG. 7A, a noise level included in a channel response estimated in a noise level estimation unit 703 is estimated from the channel response, and a threshold value can be set based on the estimated noise level in a threshold value setting unit 704.

Figure 7B:
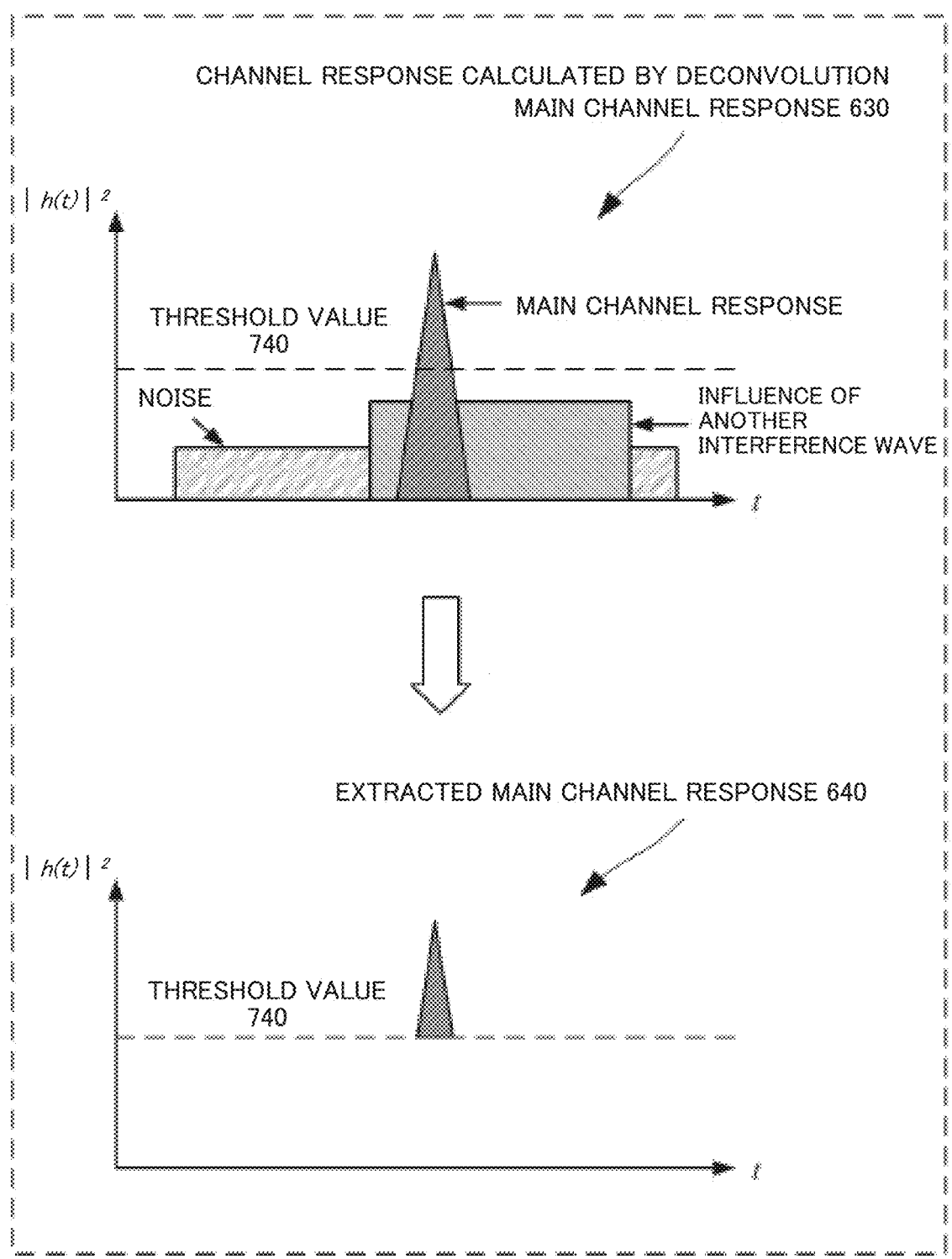
FIG. 7B is a diagram illustrating extraction processing of the main channel response extraction unit according to the second example embodiment of the present invention.

FIG. 7B is a diagram illustrating extraction processing of the main channel response extraction unit 604 according to the present example embodiment.

An upper diagram in FIG. 7B is a diagram illustrating the channel response 630 calculated by deconvolution by the intensity $|h^\sim(t)|^2$ in the time domain. A lower diagram in FIG. 7B is a diagram illustrating a main channel response 640 extracted by setting a value falling below the main channel response extraction threshold value 740 to be zero.

(Convolution Unit 605)

In a convolution unit 605, convolution is performed on the main channel response 640 extracted by the main channel response extraction unit 604 and the reference signal i, and thus an interference wave 650 resulting from the reference signal i included in the reception signal 310 is reconstructed.

(Subtraction unit 606)

In the subtraction unit 606, the reconstructed interference wave 650 is removed from the reception signal 310, and thus the interference wave is removed.

The processing of the interference removal processing unit 501 described above is performed on all reference signals of a reference signal group, and thus the signal 510 having an influence of the interference wave being reduced is generated.

<<Hardware Configuration of Signal Processing Device>>

FIG. 8A is a block diagram illustrating a hardware configuration of the signal processing device 400 according to the present example embodiment.

In FIG. 8A, a central processing unit (CPU) 810 is a processor for arithmetic control and achieves the functional configuration units in FIGS. 4 to 7A by executing a program. Note that a plurality of the CPU 810 may correspond to respective functions. A read only memory (ROM) 820 stores fixed data, such as initial data and a program, and a program. A network interface 830 controls communication with another device via a network.

A random access memory (RAM) 840 is a random access memory used as a work area for a temporary memory by the CPU 810. The RAM 840 secures a region in which data needed for achieving the present example embodiment are stored. A transmission signal (send signal) 841 is a signal transmitted from the signal processing device 400. The reception signal 310 is a signal received by the signal processing device 400. In the synthetic aperture radar, the transmission signal 841 is successively transmitted and the reception signal 310 is successively received due to movement in an azimuth direction of a satellite, and synthesis processing is performed on the reception signal 310 as an input of one radar. The selected interference wave reference signal group 520 is a reference signal group of an interference wave that may be included in the reception signal 310 from the interference wave reference signal database 450 being an interference wave with respect to the reception signal 310 transmitted from another radar. The selected interference wave reference signal group 520 has its selection being changed until the reception signal 410 having the interference wave being sufficiently removed is acquired. A selected interference wave reference signal 600 is one interference wave reference signal selected from the selected interference wave reference signal group 520, and is used for removing one interference wave in the interference removal processing unit 501. The cross-correlation function 610 is a cross-correlation taken from the reception signal 310 and one interference wave reference signal 600. The autocorrelation function 620 is an autocorrelation taken from one interference wave reference signal 600. The channel response 630 is a value acquired by performing deconvolution on the cross-correlation function 610 and the autocorrelation function 620. The main channel response 640 is the channel response 630 that exceeds the main channel response extraction threshold value 740 from a plurality of the channel responses 630 of the selected interference wave reference signal group 520. The reconstructed interference wave 650 is an interference wave reconstructed by performing convolution on the main channel response 640 and the interference wave reference signal 600. The reception signal 410 having the interference wave being removed is a signal acquired by eliminating the reconstructed interference wave 650 from the reception signal 310.

A storage 850 stores a database, various parameters, or the following data or program needed for achieving the present example embodiment. The interference wave reference signal database 450 is an interference wave reference signal group being an interference waves with respect to the reception signals 310 transmitted from other radars. An arithmetic expression 852 is an arithmetic expression used for interference wave removal in the present example embodiment. For example, a cross-correlation function expression, an autocorrelation function expression, convolution/deconvolution expressions, Fourier transform/inverse Fourier transform expressions, and the like are stored in the arithmetic expression 852. The interference removal determination threshold value 540 is a threshold value used for determining whether or not the interference wave is sufficiently removed in the reception signal 410 having the interference wave being removed. The main channel response extraction threshold value 740 is a threshold value for selecting a main channel response from a channel response in the main channel response extraction unit 604.

The following program is stored in the storage 850. A synthetic aperture radar control program 855 is a program for controlling the entire processing of a synthetic aperture radar as the signal processing device 400. An interference removal module 856 is a module for removing an interference wave from a reception signal. The interference removal module 856 includes a cross-correlation function calculation module, an autocorrelation function calculation module, convolution/deconvolution modules, a main channel response extraction module, and the like. A pulse compression module 857 is a module that performs pulse compression being range compression processing, based on the reception signal having the interference wave being removed. A synthetic aperture module 858 is a module that performs synthetic aperture processing being the azimuth compression processing, based on a signal on which range compression is performed.

An input-output interface 860 performs interfacing for controlling data input and output to and from an input-output device. In the present example embodiment, a microwave transmitter 861 that transmits a microwave of a chirped pulse having a frequency changed from a transmission antenna is connected to the input-output interface 860, and a microwave receiver 862 that receives a microwave of a chirped pulse reflected on the ground by a reception antenna is connected to the input-output interface 860. Further, a display unit 863, an operation unit 864, and the like may be connected to the input-output interface 860.

Note that data about processing such as the pulse compression processing and the synthetic aperture processing of the signal processing device 400 are not illustrated in the RAM 840 in FIG. 8. Further, a program and data related to a general-purpose function and another achievable function of the signal processing device 400 are not illustrated in the RAM 840 and the storage 850.

(Interference Removal Table)

Figure 8B:
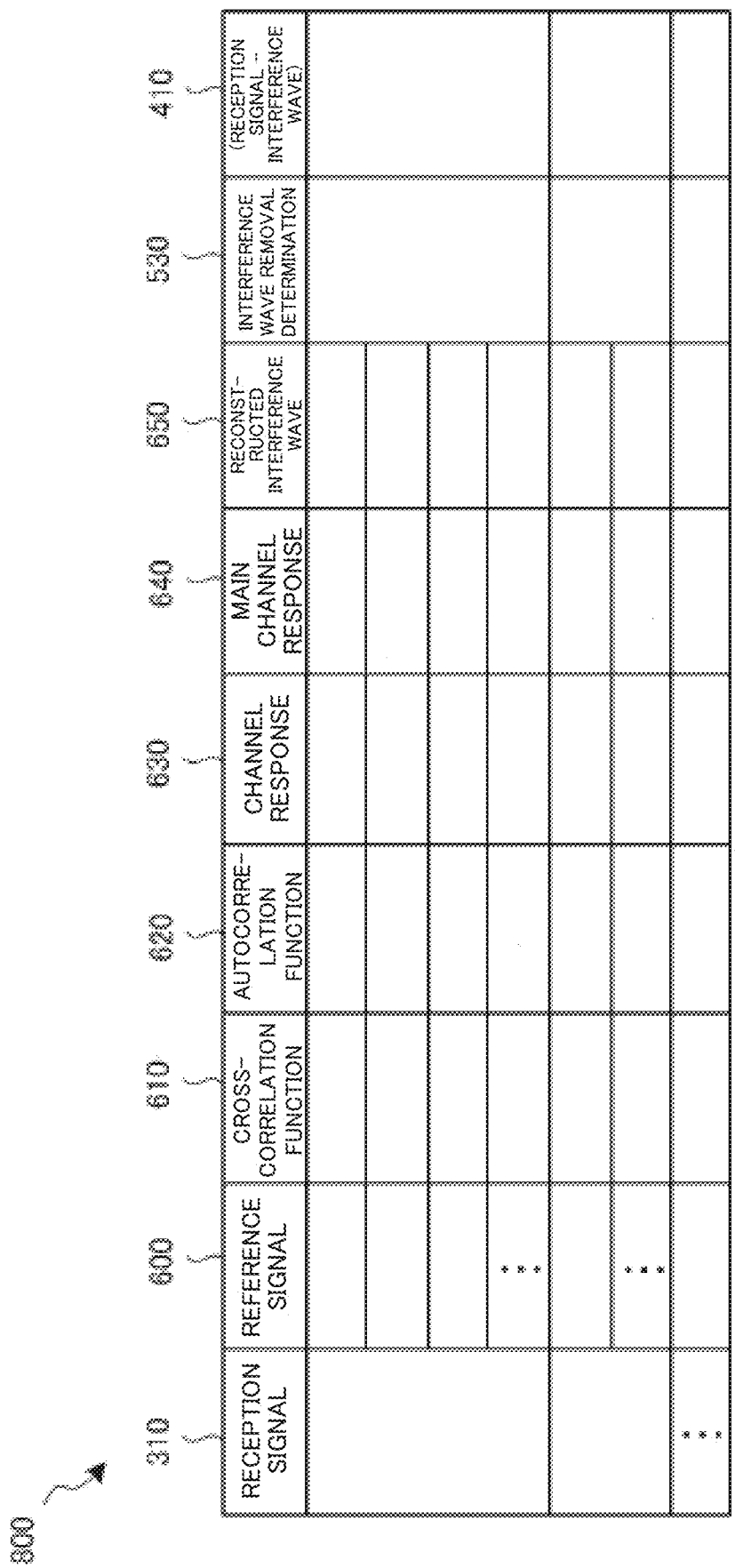
FIG. 8B is a diagram illustrating a configuration of an interference removal table according to the second example embodiment of the present invention.

FIG. 8B is a diagram illustrating a configuration of an interference removal table 800 according to the present example embodiment. The interference removal table 800 is used for acquiring the reception signal 410 from which the interference wave reconstructed from the reception signal 310 is removed in the present example embodiment.

The interference removal table 800 stores each reference signal 600 of a selected interference wave reference signal group in association with the reception signal 310. Then, in association with each reference signal 600, the cross-correlation function 610 of the reception signal 310 and each reference signal 600, the autocorrelation function 620 of each reference signal 600, and the channel response 630 acquired by performing deconvolution on the cross-correlation function 610 and the autocorrelation function 620 are stored. Furthermore, the main channel response 640 selected from the channel response 630 is stored, and the reconstructed interference wave 650 acquired by performing convolution on the main channel response 640 and the reference signal 600 is stored.

Then, a result in which the reconstructed interference wave 650 is successively removed from the reception signal 310 is compared with the interference removal determination threshold value 540. Then, the interference wave removal determination signal 530 for determining whether or not the interference wave is sufficiently removed is stored, and the reception signal 410 having the interference wave being removed when the interference wave is sufficiently removed is stored.

<<Processing Procedure of Signal Processing Device>>

Figure 9A:
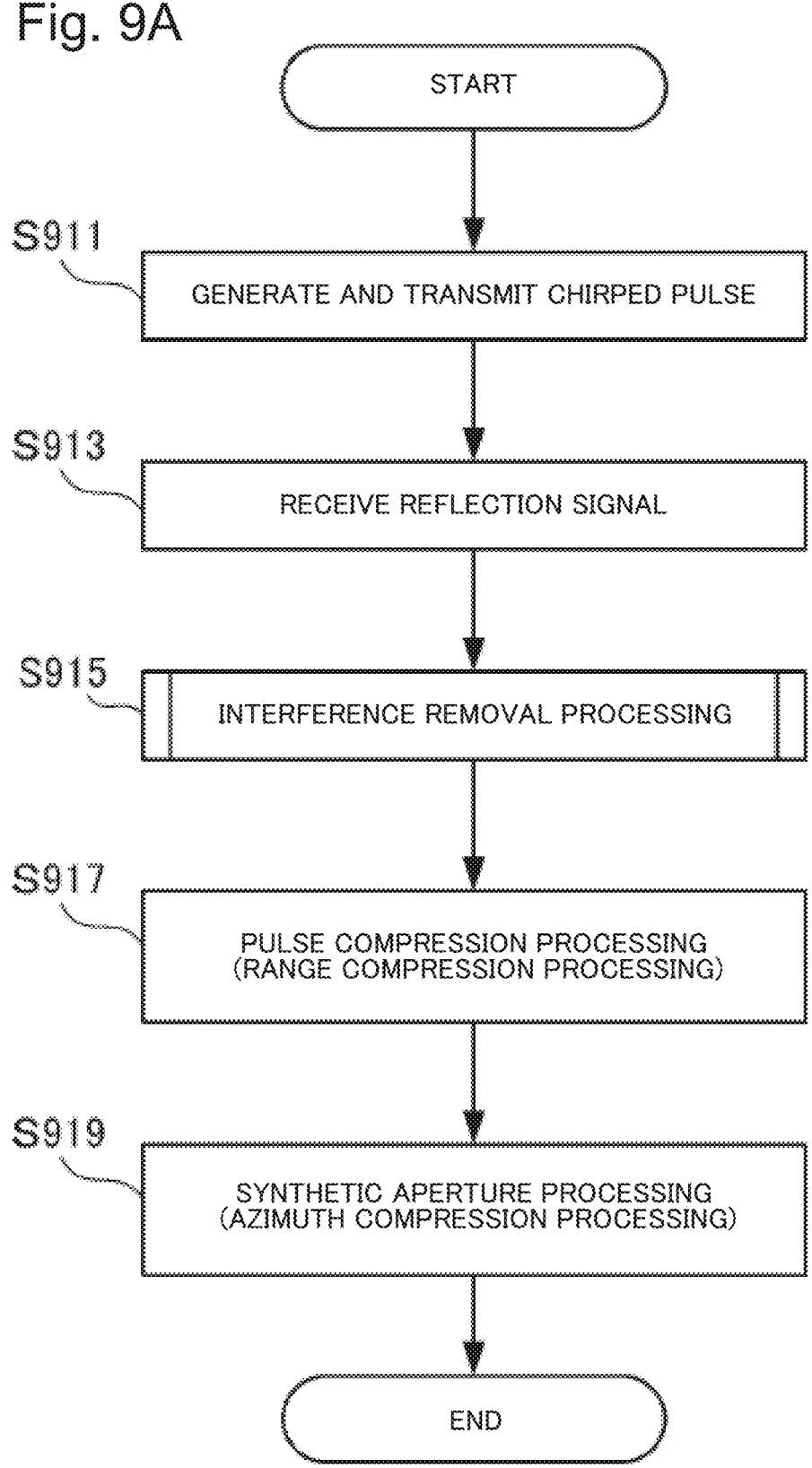
FIG. 9A is a flowchart illustrating a processing procedure of the signal processing device according to the second example embodiment of the present invention.

FIG. 9A is a flowchart illustrating a processing procedure of the signal processing device 400 according to the present example embodiment. This flowchart achieves the functional configuration units in FIGS. 4 to 7A by using the CPU 810 in FIG. 8A with the RAM 840.

In Step S911, the signal processing device 400 generates and transmits a chirped pulse having a frequency changed as a send signal. In Step S913, the signal processing device 400 receives a reflection signal of the transmitted chirped pulse as a reception signal. Then, in Step S915, the signal processing device 400 performs the interference removal processing of removing an interference wave from the reception signal.

In Step S917, the signal processing device 400 performs the pulse compression processing serving as the range compression processing of the reception signal having the interference wave being removed. Next, the signal processing device 400 performs the synthetic aperture processing of synthesizing a series of reception signals on which the pulse compression is performed by the azimuth compression processing.

(Interference Removal Processing)

Figure 9B:
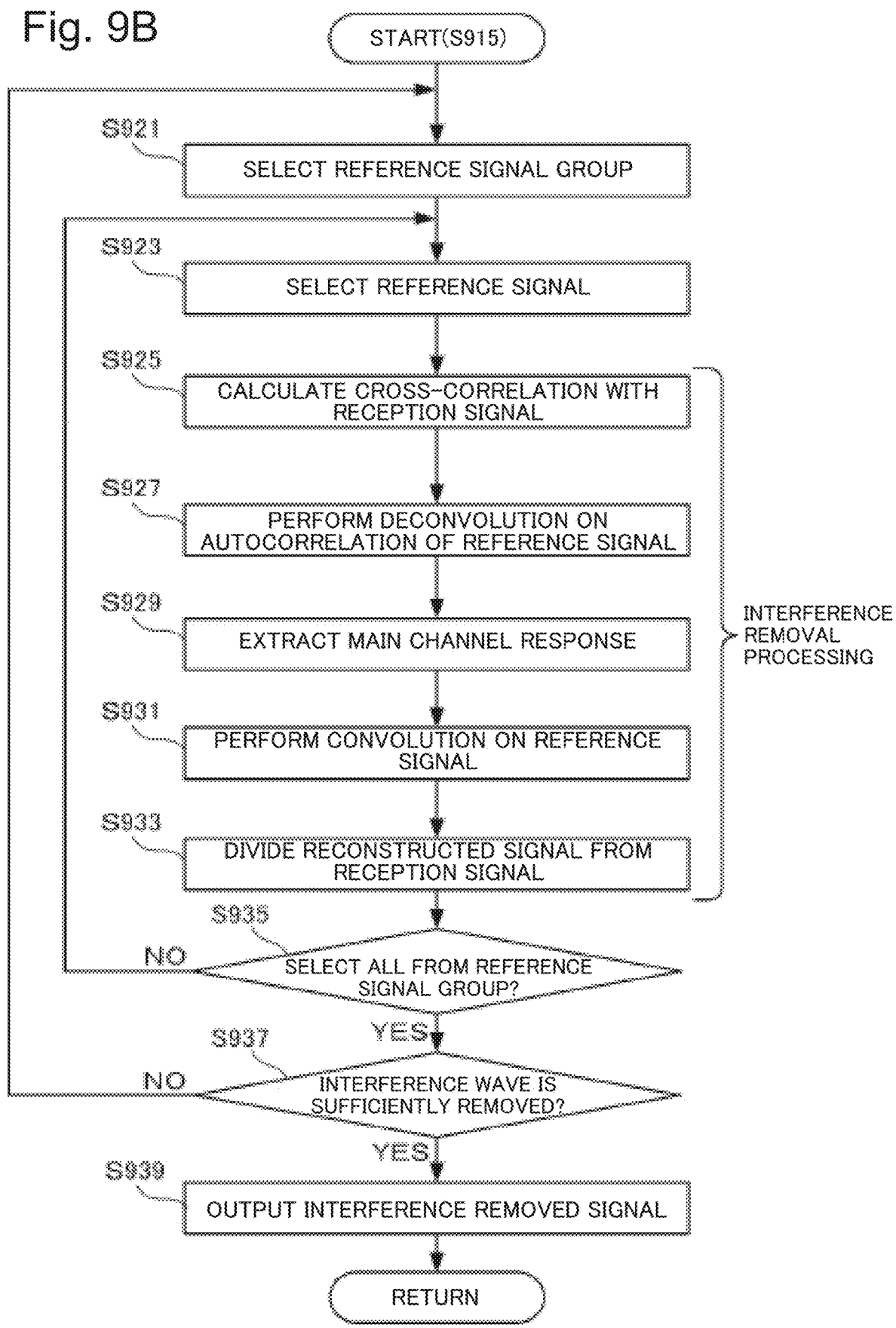
FIG. 9B is a flowchart illustrating a procedure for interference removal processing according to the second example embodiment of the present invention.

FIG. 9B is a flowchart illustrating a procedure of the interference removal processing (S915) according to the present example embodiment. FIG. 9B is a flowchart in which processing of removing a plurality of interference waves resulting from the reference signal i (i=2, . . . , and N) is performed by repeatedly using the interference removal processing by the interference removal processing unit 501 in FIG. 6.

First, in Step S921, the signal processing device 400 selects a reference signal of an interference wave that may be mixed in the reception signal from an existing reference signal group, and generates a reference signal group. Herein, a set of the reference signals i (i=2, . . . , and N) is the reference signal group. Next, in Step S923, the signal processing device 400 selects one reference signal from the reference signal group, and performs the interference removal processing including Steps S925 to S933.

As described above, the interference removal processing includes Step S925 of calculating a cross-correlation function of the reception signal and the reference signal, Step S927 of performing deconvolution on the cross-correlation function and an autocorrelation function of the reference signal, Step S929 of extracting a main channel response by threshold value determination and the like, Step S931 of performing convolution on the main channel response and the reference signal, and Step S933 of dividing the reconstructed interference wave from the reception signal. This is repeatedly performed on all reference signals of the reference signal group selected in Step S921, based on determination in Step S935.

Subsequently, in Step S937, the signal processing device 400 determines whether or not the interference wave is sufficiently removed. When the interference wave is sufficiently removed, in Step S939, the signal processing device 400 outputs the reception signal having the interference wave being removed to the pulse compression processing and terminates the processing. On the other hand, when the interference wave is not sufficiently removed, the signal processing device 400 returns the processing to Step S921, and repeats the processing from the selection of a reference signal group.

Note that, in the repetition, the same reference signal group as in the first time may be used, or, when it is clear that an interference wave resulting from the reference signal is not included in the reception signal, a new reference signal group from which the reference signal is removed may also be used.

Whether or not an interference wave is sufficiently removed can be determined by using a cross-correlation of a reception signal and a reference signal in a reference signal group. For example, results of cross-correlations with all reference signals in a reference signal group before interference removal are held, and cross-correlations with the reference signals are similarly acquired after the interference removal is performed. When the results have almost no change, it can be said that the interference wave is sufficiently removed. A plurality of interference waves resulting from the reference signal i (i=2, . . . , and N) are removed from the reception signal by the processing above.

According to the present example embodiment, deconvolution is performed on a cross-correlation function of each of a plurality of reference signals and a reception signal and on an autocorrelation function of the plurality of reference signals, and a plurality of channel responses to the plurality of respective reference signals are extracted. Then, a main channel response in which intensity of the plurality of channel responses exceed a threshold value is extracted, a signal is reconstructed by performing convolution on the reference signal, and an interference wave included in the reconstructed signal is removed from the reception signal.

With such a configuration, variety of interference waves mixed in a reception signal can be efficiently removed. In other words, the present example embodiment enables performing interference removal during simultaneous operations of a plurality of radars. This effect can be acquired for the following reason. By taking a cross-correlation of a reception signal and a certain reference signal, a component resulting from the reference signal in the reception signal is concentrated in terms of time, and a characteristic component appears in a time domain. The component acquired by performing deconvolution on the cross-correlation and an autocorrelation of the reference signal reflects a channel response to the sent reference signal. On the other hand, a component resulting from another reference signal spreads without being extremely concentrated in terms of time. The same is also applied to a noise component. For these differences, even when a noise is great, only a channel response to a reference signal of interest can be extracted in the time domain. By convoluting the channel response into the original reference signal, only a component resulting from the reference signal included in the reception signal is reconstructed, and removal of the interference wave can be achieved by dividing the component from the reception signal.

Third Example Embodiment

Next, a signal processing device according to a third example embodiment of the present invention is described. The signal processing device according to the present example embodiment is different from that in the second example embodiment described above in that extraction of a main channel response and consequently interference removal are performed more precisely by including a send signal as a reference signal of the reception signal in a reference signal group that takes a cross-correlation with a reception signal and an autocorrelation. The other configuration and operation are similar to those in the second example embodiment, and thus the same configuration and operation are provided with the same reference signs, and detailed description thereof is omitted.

In the signal processing device according to the present example embodiment, a reference signal group includes a reference signal to be a candidate for an interference wave included in a reception signal and a reference signal associated with a send signal, and a signal having the interference wave and a desired signal being removed is output after extraction of a channel response, extraction of a main channel response, and removal of a reconstructed signal are repeatedly performed on each reference signal of the reference signal group. When this output signal does not include a significant signal, the reception signal having the interference wave being removed is output. On the other hand, when a significant signal is included in the signal having the interference wave and the reception signal being removed, a reference signal group is reselected.

Interference removal processing on a reception signal of a radar 1 is described in the present example embodiment, provided that N synthetic aperture radars are simultaneously operated, and a send pattern used in each of the radars is a reference signal i, similarly to the first example embodiment. In the first example embodiment, a reference signal group is formed from a reference signal i (i=2, . . . , and N) of an interference wave that may be mixed in a reception signal. In the present example embodiment, a reference signal group is formed from the reference signal i of the interference wave used in the first example embodiment together with a reference signal i=1 of a send signal. In this way, the extraction of a main channel response and consequently the interference removal can be performed more precisely.

(Interference Removal Unit)

Figure 10A:
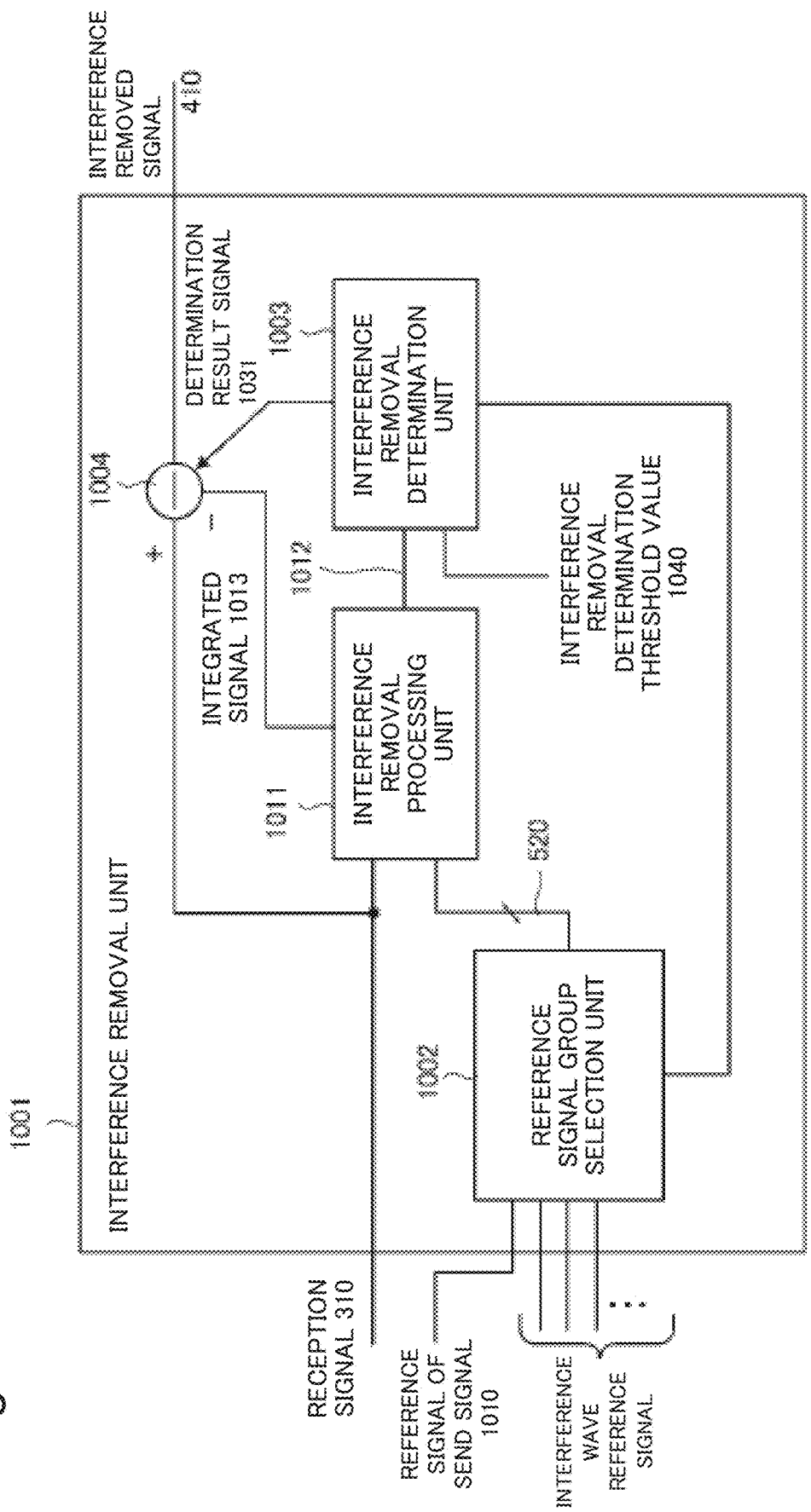
FIG. 10A is a block diagram illustrating a functional configuration of an interference removal unit according to a third example embodiment of the present invention.

FIG. 10A is a block diagram illustrating a functional configuration of an interference removal unit 1001 according to the present example embodiment. A component in FIG. 10A similar to that in FIG. 5 is provided with the same reference sign, and repeated description thereof is omitted.

A reference signal 450 of an interference wave and a reference signal 1010 of a send signal are input to a reference signal group selection unit 1002. Unlike the interference removal processing unit 501 in FIG. 5, an interference signal group selected by the interference wave reference signal 450 that includes a reference signal 1010 associated with a send signal is input as a reference signal group 520 to an interference removal processing unit 1011, instead of the interference signal group selected by the interference wave reference signal 450. Further, an interference removal determination signal 1012 acquired by subtracting a signal reconstructed based on the reference signal group from a reception signal and an integrated signal 1013 acquired by integrating a reconstructed interference wave are output from the interference removal processing unit 1011.

An interference removal determination unit 1003 determines whether or not the interference removal determination signal 1012 output from the interference removal processing unit 1011 has a significant value, based on an interference removal determination threshold value 1040. Then, when the interference removal determination unit 1003 determines that the interference removal determination signal 1012 does not have a significant value, a subtraction unit 1004 is activated by interference wave removal determination 1031. The subtraction unit 1004 is activated by the interference wave removal determination 1031, subtracts, from a reception signal 310, the integrated signal 1013 when it has been determined that the interference removal determination signal 1012 does not have a significant value, and outputs an interference removed signal 410 being the reception signal having the interference wave being removed.

(Interference Removal Processing Unit)

Figure 10B:
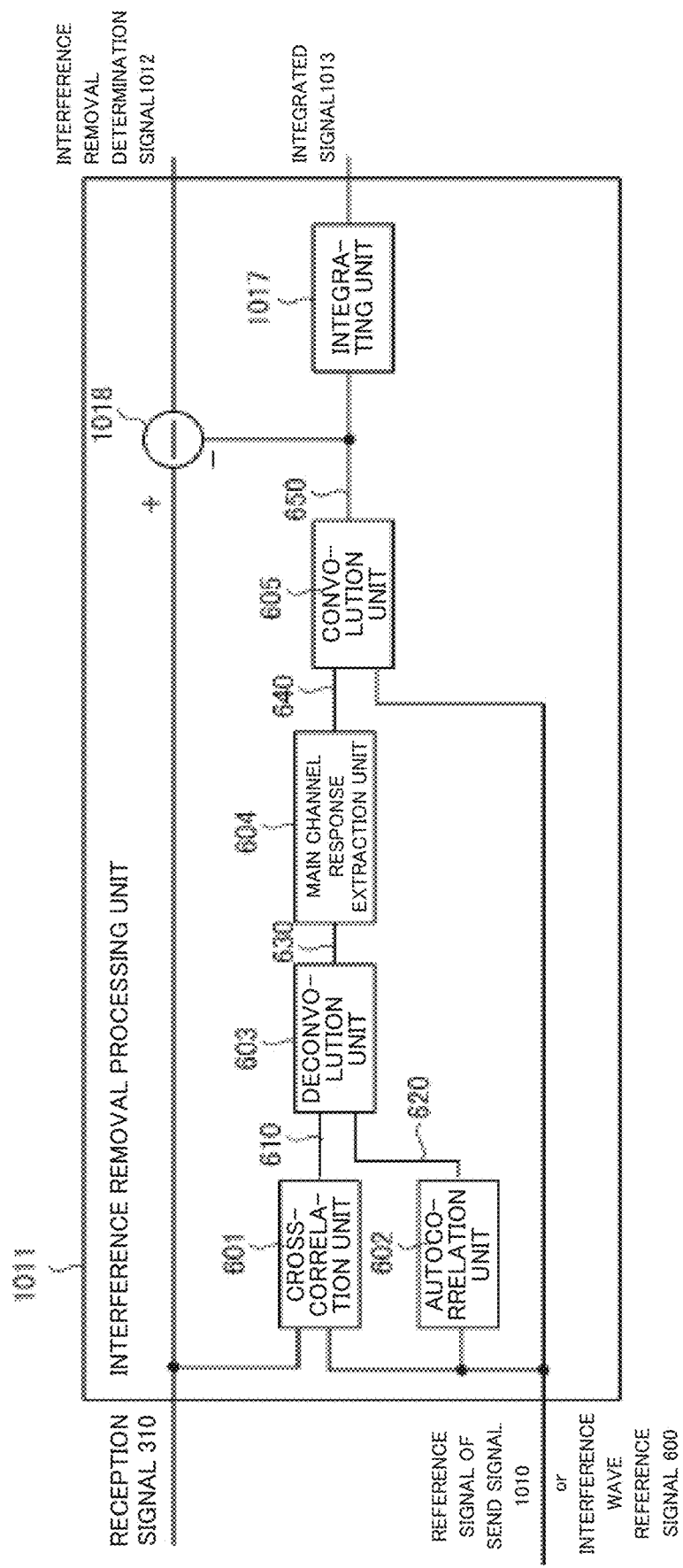
FIG. 10B is a block diagram illustrating a functional configuration of an interference removal processing unit according to the third example embodiment of the present invention.

FIG. 10B is a block diagram illustrating a functional configuration of the interference removal processing unit 1011 according to the present example embodiment. A component in FIG. 10B similar to that in FIG. 6 is provided with the same reference sign, and repeated description thereof is omitted.

In the interference removal processing unit 1011, one reference signal selected from the reference signal 1010 of the send signal and a reference signal 600 of an interference wave is input to a cross-correlation unit 601 and an autocorrelation unit 602.

The interference removal processing unit 1011 includes an integrating unit 1017 and a subtraction unit 1018. A convolution unit 605 outputs a signal 650 reconstructed based on the reference signal selected from the reference signal 1010 of the send signal and the reference signal 600 of the interference wave. When the reconstructed signal 650 is not calculated based on the send signal 1010, the integrating unit 1017 integrates and stores the reconstructed signal 650. The subtraction unit 1018 repeatedly subtracts the reconstructed signal 650 output from the convolution unit 605 from the reception signal 310, and outputs the interference removal determination signal 1012 to the interference removal determination unit 1003.

<<Hardware Configuration of Signal Processing Device>>

Figure 11A:
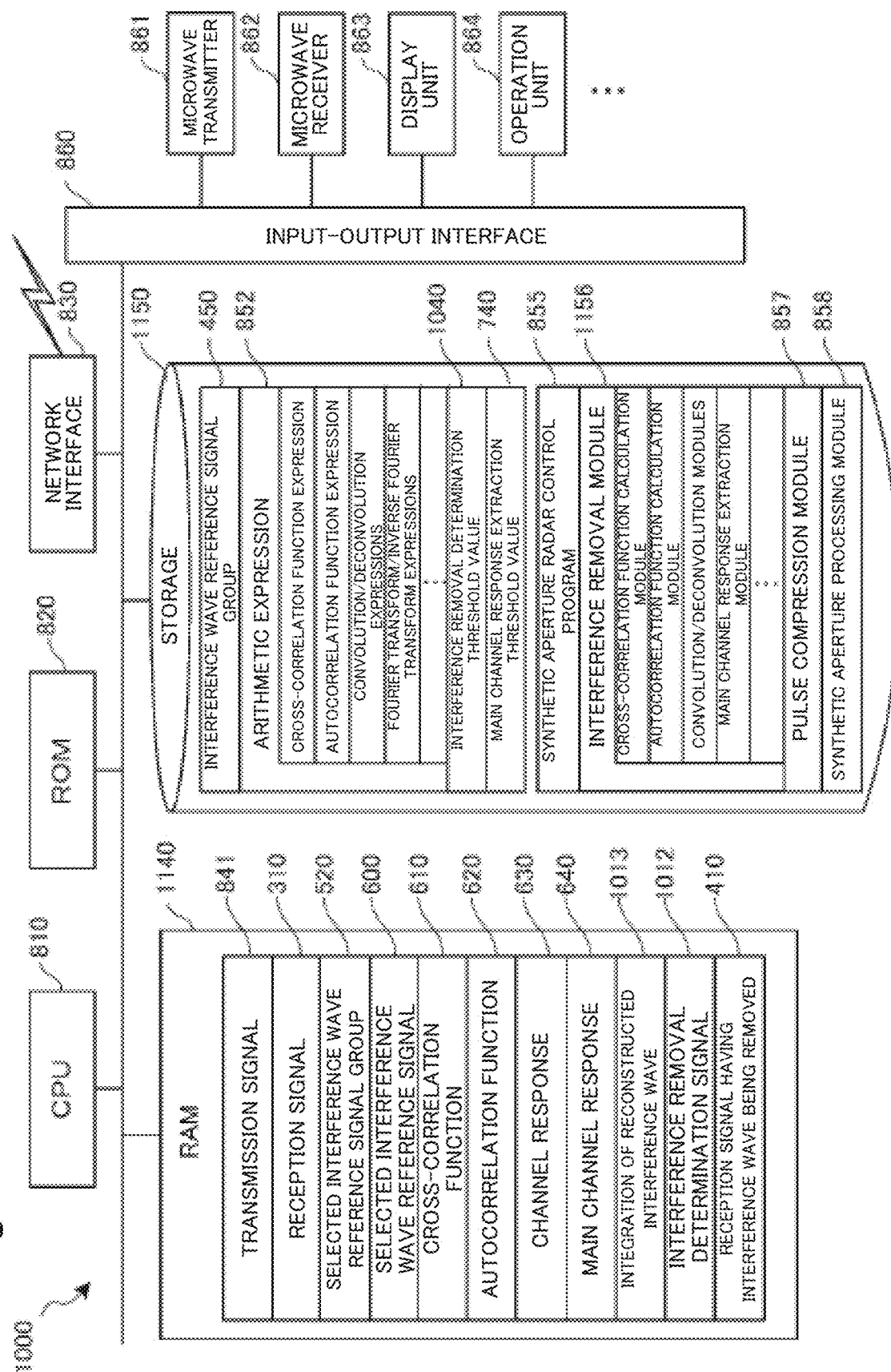
FIG. 11A is a block diagram illustrating a hardware configuration of the signal processing device according to the third example embodiment of the present invention.

FIG. 11A is a block diagram illustrating a hardware configuration of the signal processing device 1000 according to the present example embodiment. A structural component in FIG. 11A similar to that in FIG. 8A is provided with same reference sign, and the repeated description thereof is omitted.

In an RAM 1140 of the signal processing device 1000, the integrated signal 1013 of the interference wave reconstructed from the reception signal and the reference signal group and the interference removal determination signal 1012 in the present example embodiment are stored. Further, in a storage 1150 of the signal processing device 1000, the interference removal determination threshold value 1040 for determining whether or not interference removal is sufficiently performed in the present example embodiment and an interference removal module 1156 in the present example embodiment are stored.

(Interference Removal Table)

Figure 11B:
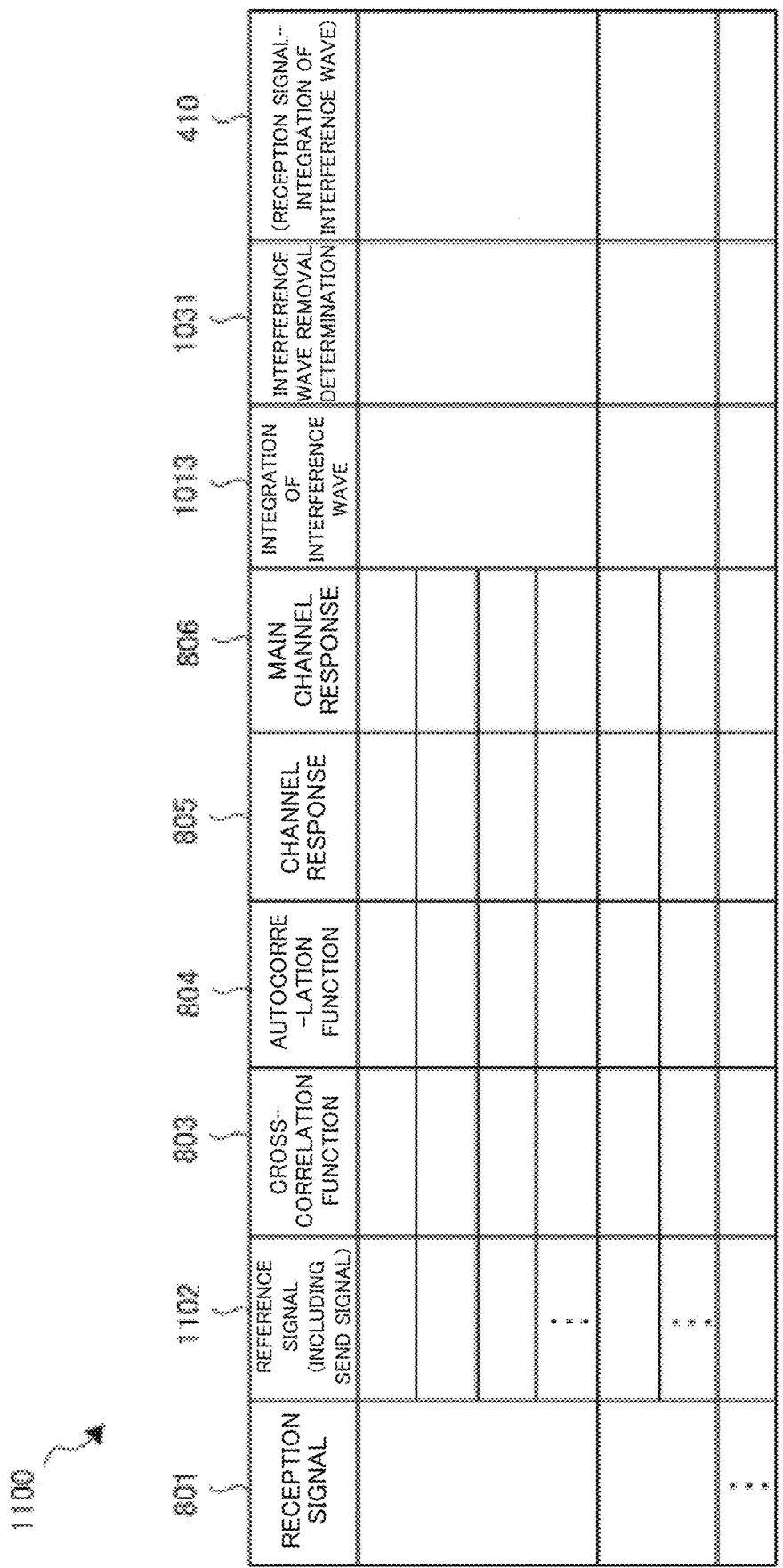
FIG. 11B is a diagram illustrating a configuration of an interference removal table according to the third example embodiment of the present invention.

FIG. 11B is a diagram illustrating a configuration of an interference removal table 1100 according to the present example embodiment. Note that, a structural component in FIG. 11B similar to that in FIG. 8B is provided with the same reference sign, and repeated description thereof is omitted.

The interference removal table 1100 stores a reference signal 1102 that is a reference signal associated with a reception signal and includes a send signal, the integrated signal 1013 of the reconstructed interference wave, the interference wave removal determination 1031 indicating that whether or not a significant subtraction value exceeds the interference removal determination threshold value 1040, and the reception signal 410 having the interference wave removed (=reception signal−integration of interference wave).

(Interference Removal Processing)

Figure 12:
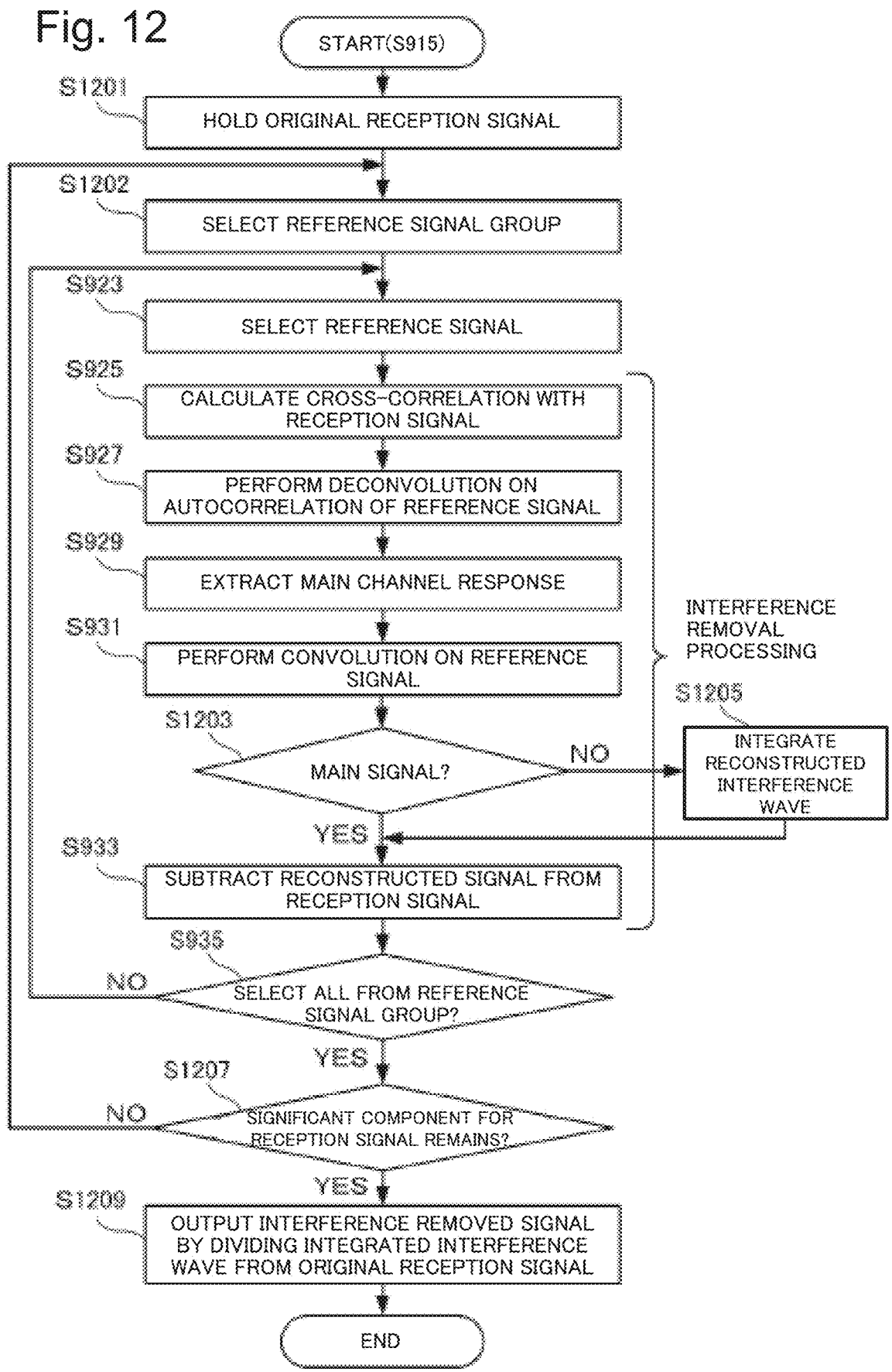
FIG. 12 is a flowchart illustrating a procedure for interference removal processing according to the third example embodiment of the present invention.

FIG. 12 is a flowchart illustrating a procedure of the interference removal processing (S915) according to the present example embodiment. This flowchart achieves the functional configuration units in FIGS. 10A and 10B by using the CPU 810 in FIG. 11A with the RAM 1140. A step in FIG. 12 similar to that in FIG. 9B is provided with same step number, and the repeated description thereof is omitted.

First, in Step S1201, the signal processing device 1000 holds an original reception signal, and performs processing on a reception signal acquired by duplicating the original reception signal. In Step S1202, the signal processing device 1000 selects, as a reference signal group, a reference signal of an interference wave that may be mixed in the reception signal together with a reference signal of a main signal. Next, in Step S923, the signal processing device 1000 selects one reference signal from the reference signal group, and performs the interference removal processing.

The interference removal processing in the present example embodiment reconstructs a signal by performing convolution on an extracted main channel response and a reference signal, and then determines whether or not the reconstructed signal is a main signal in Step S1203 in addition to FIG. 9B in the second example embodiment. When the reconstructed signal is not a main signal and is an interference wave, the interference wave is integrated and held in Step S1205. This is repeatedly performed on all reference signals in the reference signal group, and thus a main signal and an interference wave included in the reception signal are removed and reduced.

When a main signal and an interference wave remain in the reception signal, the processing returns to the selection of a reference signal in Step S923 from Step S935 and is repeatedly performed. A significant component is not left in the reception signal in the end, which leaves only a noise component. Therefore, in Step S1207, the signal processing device 1000 determines whether or not a significant component remains, and, when a significant component remains, the processing returns to the selection of a reference signal group in Step S1202 and is repeatedly performed.

When a state where a significant component does not remain is reached, the repetition is terminated. Then, in Step S1209, since the signal processing device 1000 holds the integration of the interference wave that has been divided, the reception signal having the interference wave being removed can be acquired by dividing the interference wave from the original reception signal in the end.

According to the present example embodiment, a main signal resulting from a reference signal due to a send signal is also removed from a reception signal, and thus high precision of extraction of a main channel response and interference removal is achieved.

The reason why the present example embodiment enables the high precision of the extraction of a main channel response and the interference removal is as follows. For a certain reference signal i, a component resulting from a reference signal due to a send signal is included in an estimated channel response h(t) acquired by calculating a cross-correlation function of a reception signal and a reference signal and performing deconvolution on the cross-correlation function and an autocorrelation function of the reference signal. When a channel response is acquired by using a reference signal i (i=2, . . . , and N) of an interference wave, a component resulting from the reference signal i becomes information of interest, and the component resulting from the reference signal due to the send signal behaves as an interference wave. Therefore, the component resulting from the reference signal due to the send signal may conceal the information of interest. According to the present example embodiment, a main signal resulting from the reference signal due to the send signal is also removed from the reception signal, and thus this influence is avoided, and high precision of extraction of a main channel response and interference removal is achieved.

During a process of removing a component resulting from a certain reference signal included in such a reception signal, in consideration of the above-described influence in which a component resulting from another reference signal behaves as an interference wave, it is preferable that cross-correlations of the reception signal and all reference signals in a reference signal group are acquired, and the reference signals are selected in descending size order when a reference signal is selected from the reference signal group. In this way, deteriorated precision of extraction of a main channel response during subsequent repetition can be prevented, and the number of necessary repetitions can be reduced.

<<Verification Result in Present Example Embodiment>>

Hereinafter, interference removal digital signal processing according to the present example embodiment is verified by a numerical calculation simulation. A case where two synthetic aperture radars as the signal processing device in the present example embodiment perform radar observation while moving on a straight line at a speed of 250 m/s at a distance of 1 km therebetween is simulated. The first radar sends a pulse having a carrier frequency of 1 GHz, a time width 100 μs, and a chirped rate of 100 MHz/100 μs in a cycle of 100 Hz. The second radar sends a pulse having a chirped rate of 90 MHz/100 μs, which is an only difference. The radars have an antenna length of 10 m and an altitude of approximately 28 km, and 40 spot scatterers distributed in a ground range in the vicinity of approximately 10 km are observed.

Figure 13:
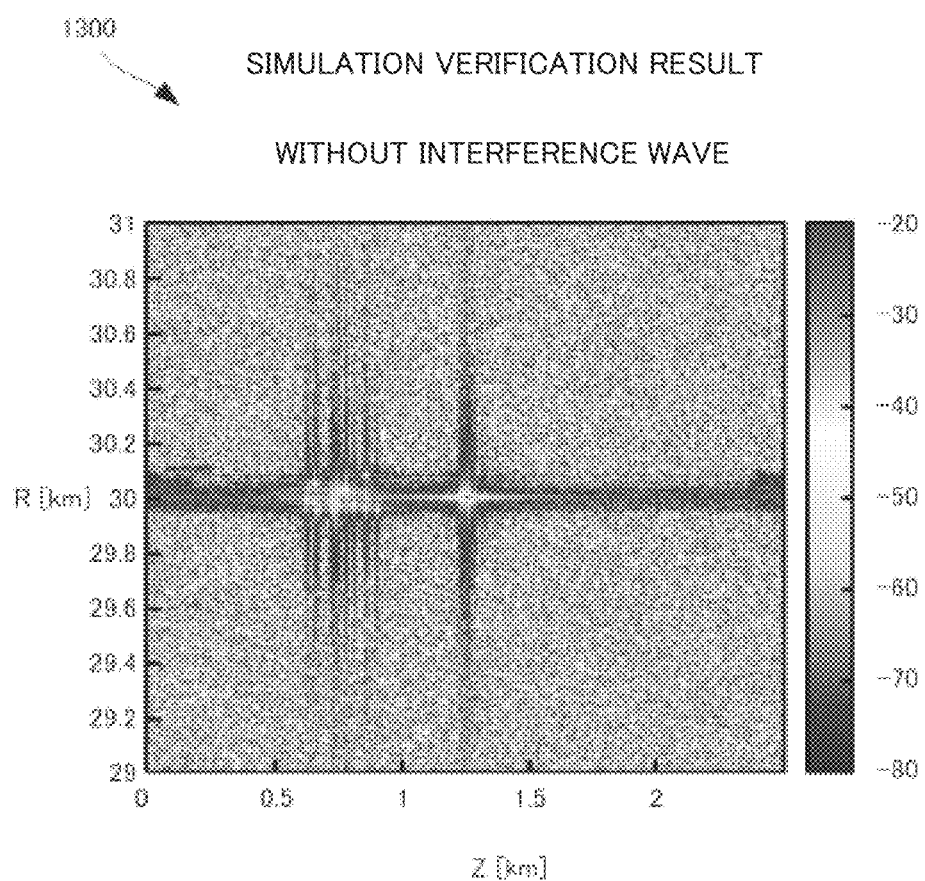
FIG. 13 is a diagram illustrating a calculation simulation verification result without an interference wave in the signal processing device according to the example embodiment of the present invention.

FIG. 13 is a diagram illustrating a calculation simulation verification result without an interference wave in the signal processing device according to the present example embodiment. FIG. 13 is a diagram illustrating an image after the synthetic aperture processing when only the first radar performs observation and a result after the pulse compression and the synthetic aperture processing does not include an interference wave.

Figure 14:
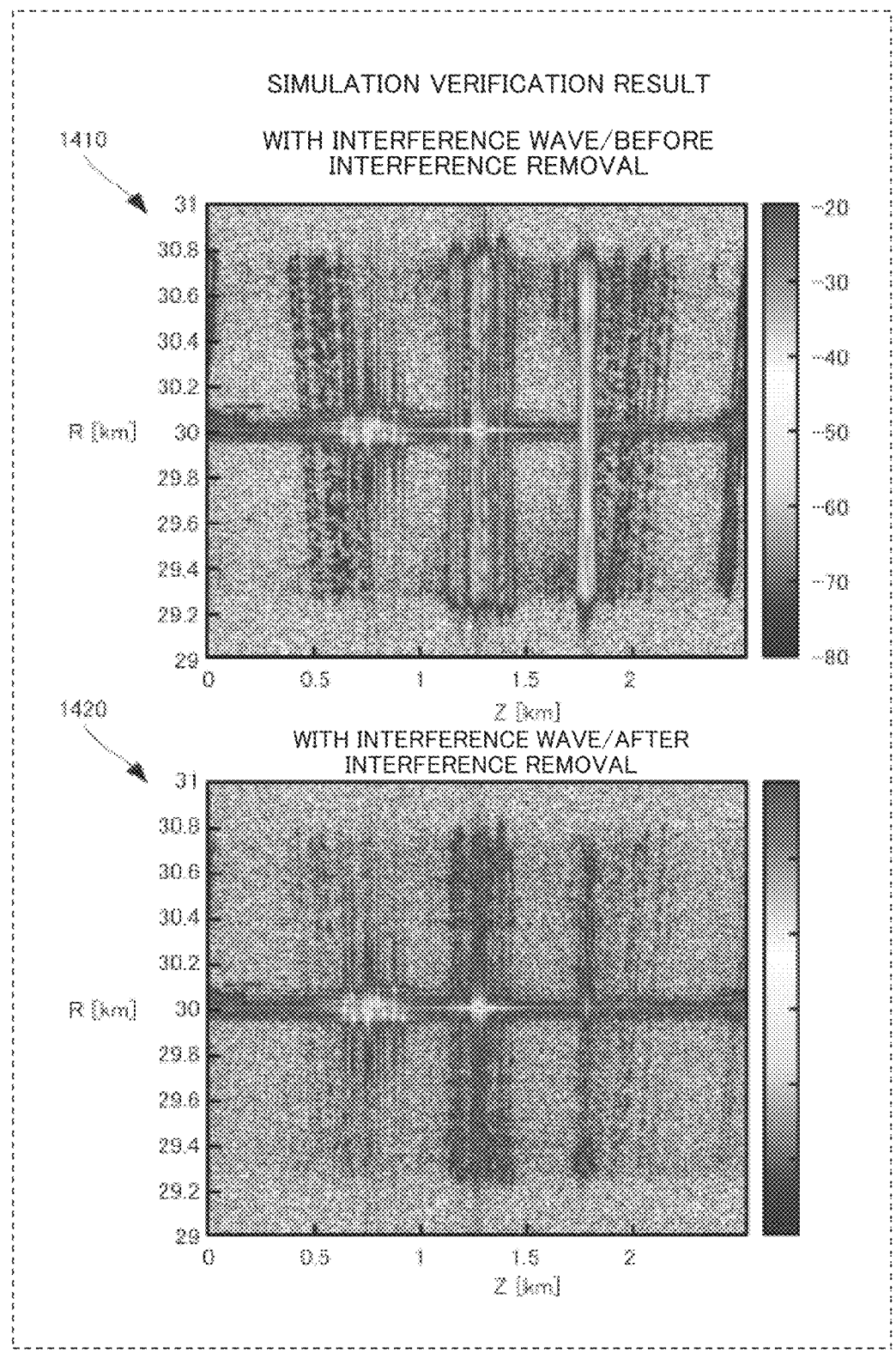
FIG. 14 is a diagram illustrating a calculation simulation verification result with an interference wave in the signal processing device according to the example embodiment of the present invention.

FIG. 14 is a diagram illustrating a calculation simulation verification result with an interference wave in the signal processing device according to the present example embodiment. An upper diagram of FIG. 14 is a diagram illustrating an image of a result in which the two radars are disposed and perform observation, and the pulse compression and the synthetic aperture processing are performed on a raw reception signal without performing interference removal. A lower diagram of FIG. 14 is a diagram illustrating an image of a result in which the two radars are disposed and perform observation, and the pulse compression and the synthetic aperture processing are performed on a reception signal on which the interference removal in the present example embodiment is performed.

In comparison between the diagrams in FIGS. 13 and 14, it is possible to confirm that an influence of an interference wave appearing when the interference removal is not performed is reduced when the interference removal in the present example embodiment is performed.

Other Example Embodiment

Note that the configuration that allows efficient removal of an interference wave by another radar signal included in a reception signal in a synthetic aperture radar from a satellite is described in the example embodiment described above. However, the present invention is not limited to the efficient removal of an interference wave in the synthetic aperture radar from a satellite. Even in another field in which observation is performed by reflection of a transmission signal, when a transmission signal being a base of an interference wave and a waveform of the transmission signal are known, the present invention is applicable as a technique of efficiently performing removal of an interference wave.

Figure 15:
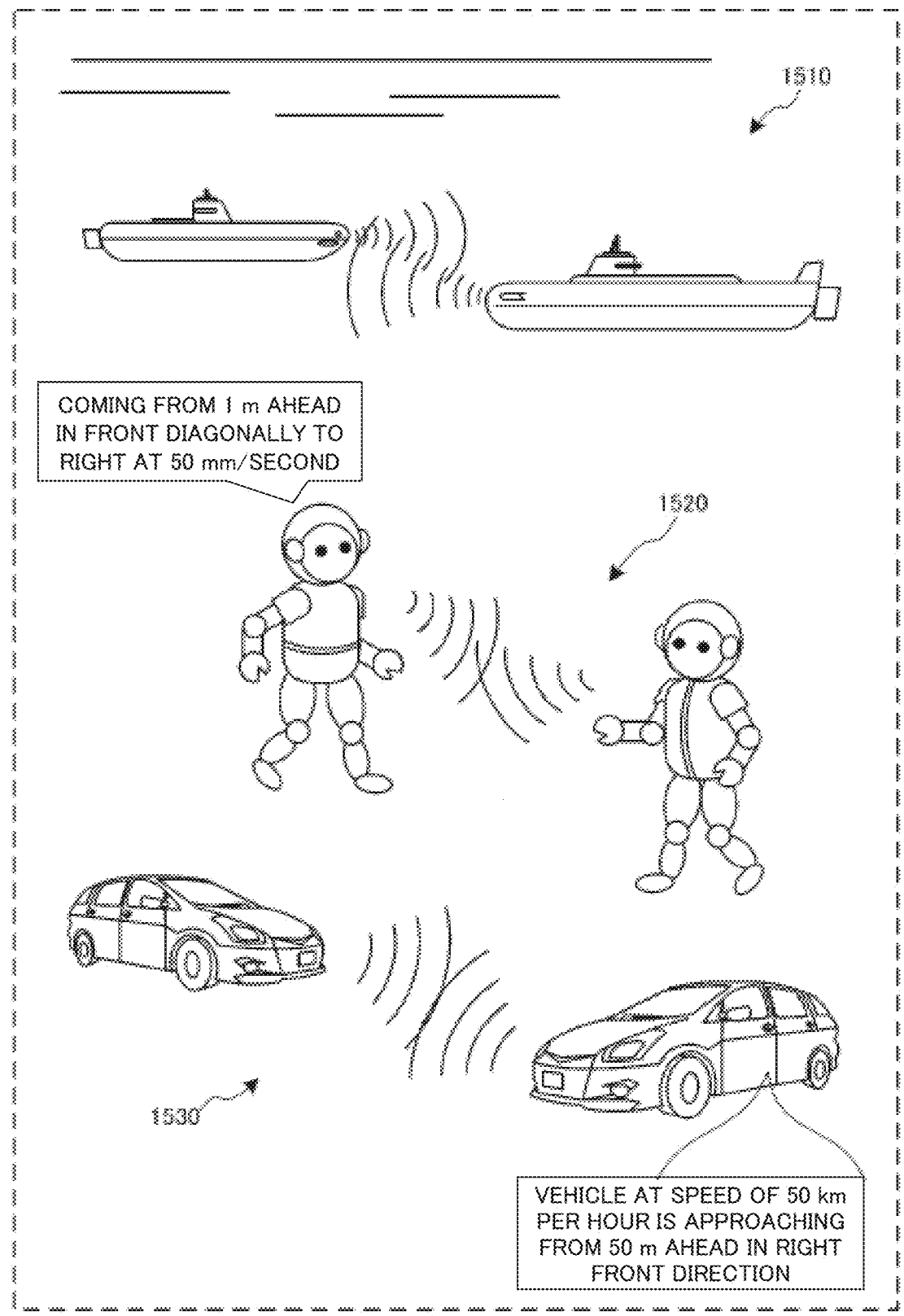
FIG. 15 is diagram for describing another environment to which the signal processing device according to the example embodiment of the present invention is applied.

For example, FIG. 15 is a diagram illustrating another field in which the present invention can be used. As illustrated in FIG. 15, a method of removing an interference wave of a radar described above can be used in a technique 1520 for allowing robots to pass each other without bumping into each other and a technique 1530 for avoiding a collision of a car. However, the present invention is not limited to these, and may also be used for monitoring an intruder in an office and the like, detecting movement of a person in a gymnasium, and the like. The present invention can also be used in removal of an interference wave by a sound wave in the air or the water instead of a radio wave. The present invention is also applicable to a technique 1510 using a sound wave called active sonar in monitoring in the water such as a harbor.

Although the present invention has been described with reference to the example embodiments, it should be understood that the present invention is not limited to the above-described example embodiments. Various modifications that can be understood by those skilled in the art within the scope of the present invention may be applied to the configuration and the details of the present invention. Further, a system or a device that combines different features included in the respective example embodiments in any form is also included within the scope of the present invention.

Further, the present invention may be applied to a system including a plurality of apparatuses or may be applied to a single device. Furthermore, the present invention is also applicable to a case where a signal processing program achieving functions of the example embodiments is supplied to a system or a device directly or remotely. Therefore, in order to achieve functions of the present invention by a computer, a program installed on the computer, a medium that stores the program, or a World Wide Web (WWW) server that causes the program to be downloaded is also included within the scope of the present invention. In particular, at least a non-transitory computer readable medium that stores a program causing a computer to execute a processing step included in the above-described example embodiments is included within the scope of the present invention.

Other Expression of Example Embodiment

The whole or part of the example embodiments disclosed above can be described as, but not limited to, the following supplementary notes.

[Supplementary Note 1]

A signal processing device comprising:

first extraction means for performing deconvolution on a cross-correlation function of a reference signal and a reception signal, and an autocorrelation function of the reference signal, and extracting a channel response to the reference signal;

second extraction means for extracting a main channel response associated with the reference signal from the channel response; and removal means for reconstructing a signal by performing convolution on the reference signal and the main channel response, and removing the reconstructed signal from the reception signal.

[Supplementary Note 2]

The signal processing device according to Supplementary Note 1, wherein the second extraction means extracts, as the main channel response, the channel response including a component in which intensity in a time domain of deconvolution performed on a cross-correlation function of the reference signal and a reception signal, and an autocorrelation function of the reference signal exceeds a threshold value provided according to a noise level.

[Supplementary Note 3]

The signal processing device according to Supplementary Note 1 or 2, wherein a Wiener filter is used for deconvolution in the first extraction means.

[Supplementary Note 4]

The signal processing device according to any one of Supplementary Notes 1 to 3, wherein extraction of the channel response by the first extraction means, extraction of the main channel response by the second extraction means, and removal of the reconstructed signal by the removal means are repeatedly performed on each reference signal of a predetermined reference signal group.

[Supplementary Note 5]

The signal processing device according to Supplementary Note 4, wherein the predetermined reference signal group includes a reference signal to be a candidate for an interference wave included in the reception signal, and the removal means outputs a reception signal having an interference wave being removed after extraction of the channel response, extraction of the main channel response, and removal of the reconstructed signal are repeatedly performed on each reference signal of the predetermined reference signal group.

[Supplementary Note 6]

The signal processing device according to Supplementary Note 5, further comprising first selection means for selecting a reference signal group to be a candidate for an interference wave included in the reception signal, and reselecting a reference signal group when an interference wave is not sufficiently removed from a reception signal having the interference wave being removed.

[Supplementary Note 7]

The signal processing device according to Supplementary Note 4, wherein the predetermined reference signal group includes a reference signal to be a candidate for an interference wave included in the reception signal, and a reference signal associated with a send signal, and the removal means outputs a reception signal having an interference wave being removed when a signal having an interference wave and a reception signal being removed does not include a significant signal after extraction of the channel response, extraction of the main channel response, and removal of the reconstructed signal are repeatedly performed on each reference signal of the predetermined reference signal group.

[Supplementary Note 8]

The signal processing device according to Supplementary Note 7, further comprising second selection means for selecting a reference signal group to be a candidate for an interference wave included in the reception signal, and reselecting a reference signal group when a signal having the interference wave and the reception signal being removed includes a significant signal.

[Supplementary Note 9]

The signal processing device according to any one of Supplementary Notes 5 to 8, further comprising:

pulse compression means for performing pulse compression, based on a reception signal having the interference wave being removed and a range reference signal; and synthetic aperture processing means for performing synthetic aperture processing, based on a result of the pulse compression and an azimuth reference signal.

[Supplementary Note 10]

The signal processing device according to any one of Supplementary Notes 1 to 9, further comprising transmission means for transmitting a chirped pulse having a frequency changing in terms of time.

[Supplementary Note 11]

A signal processing method comprising:

a first extraction step of performing deconvolution on a cross-correlation function of a reference signal and a reception signal, and an autocorrelation function of the reference signal, and extracting a channel response to the reference signal;

a second extraction step of extracting a main channel response associated with the reference signal from the channel response; and a removal step of reconstructing a signal by performing convolution on the reference signal and the main channel response, and removing the reconstructed signal from the reception signal.

[Supplementary Note 12]

A signal processing program causing a computer to execute:

an extraction step of performing deconvolution on a cross-correlation function of a reference signal and a reception signal, and an autocorrelation function of the reference signal, and extracting a channel response to the reference signal;

a second extraction step of extracting a main channel response associated with the reference signal from the channel response; and a removal step of reconstructing a signal by performing convolution on the reference signal and the main channel response, and removing the reconstructed signal from the reception signal.

[Supplementary Note 13]

A method of removing an inter-radar interference, the method comprising:

a cross-correlation step of calculating a cross-correlation function of each of a plurality of reference signals and a reception signal;

an autocorrelation step of calculating an autocorrelation function of the plurality of reference signals;

a first extraction step of performing deconvolution on the cross-correlation function and the autocorrelation function, and extracting a plurality of channel responses to the plurality of respective reference signals;

a second extraction step of extracting a main channel response in which intensity of the plurality of channel responses exceeds a threshold value;

a reconstruction step of reconstructing a signal by performing convolution on the reference signal and the main channel response;

a removal step of removing the reconstructed signal from the reception signal; and a control step of performing control in such a way that each of the above-described steps is repeatedly performed on each reference signal of a predetermined reference signal group.

What is claimed is:

1. A signal processing device comprising:
   a memory configured to store instructions; and
   at least one processor configured to execute the instructions to:
   receive a reflection signal of a chirped pulse transmitted from a radar, wherein the reflection signal is reflected by an object;
   perform deconvolution on a cross-correlation function of a reference signal and a reception signal, and an autocorrelation function of the reference signal;
   extract a channel response to the reference signal;
   extract a main channel response associated with the reference signal from the channel response;
   reconstruct a signal by performing convolution on the reference signal and the main channel response;
   remove the reconstructed signal from the reception signal; and
   output the reception signal after removing of the reconstructed signal, wherein the reconstructed signal comprises interference waves, such that the interference waves are removed from the reception signal that is output.

2. The signal processing device according to claim 1, wherein
the at least one processor is further configured to execute the instructions to:
extract as the main channel response, the channel response including a component in which intensity in a time domain of deconvolution performed on a cross-correlation function of the reference signal and a reception signal, and an autocorrelation function of the reference signal exceeds a threshold value provided according to a noise level.

3. The signal processing device according to claim 1, wherein
a Wiener filter is used for the deconvolution.

4. The signal processing device according to claim 1, wherein
extraction of the channel response, extraction of the main channel response, and removal of the reconstructed signal are repeatedly performed on each reference signal of a predetermined reference signal group.

5. The signal processing device according to claim 4, wherein
the predetermined reference signal group includes a reference signal to be a candidate for an interference wave included in the reception signal, and
the at least one processor further configured to execute the instructions to:
output a reception signal having an interference wave being removed after extraction of the channel response, extraction of the main channel response, and removal of the reconstructed signal are repeatedly performed on each reference signal of the predetermined reference signal group.

6. The signal processing device according to claim 5, wherein
the at least one processor is further configured to execute the instructions to:
select a reference signal group to be a candidate for an interference wave included in the reception signal; and
reselect a reference signal group when an interference wave is not sufficiently removed from a reception signal having the interference wave being removed.

7. The signal processing device according to claim 4, wherein
the predetermined reference signal group includes a reference signal to be a candidate for an interference wave included in the reception signal, and a reference signal associated with a send signal, and
the at least one processor is further configured to execute the instructions to:
output a reception signal having an interference wave being removed when a signal having an interference wave and a reception signal being removed does not include a significant signal after extraction of the channel response, extraction of the main channel response, and removal of the reconstructed signal are repeatedly performed on each reference signal of the predetermined reference signal group.

8. The signal processing device according to claim 7, wherein the at least one processor is further configured to execute the instructions to:
select a reference signal group to be a candidate for an interference wave included in the reception signal; and
reselect a reference signal group when a signal having the interference wave and the reception signal being removed includes a significant signal.

9. The signal processing device according to claim 5, wherein
the at least one processor is further configured to execute the instructions to:
perform pulse compression, based on a reception signal having the interference wave being removed and a range reference signal; and
perform synthetic aperture processing, based on a result of the pulse compression and an azimuth reference signal.

10. The signal processing device according to claim 1, wherein
the at least one processor is further configured to execute the instructions to:
transmit the chirped pulse having a frequency changing in terms of time.

11. A signal processing method comprising:
receiving a reflection signal of a chirped pulse transmitted from a radar, wherein the reflection signal is reflected by an object;
performing deconvolution on a cross-correlation function of a reference signal and a reception signal, and an autocorrelation function of the reference signal, and extracting a channel response to the reference signal;
extracting a main channel response associated with the reference signal from the channel response; and
reconstructing a signal by performing convolution on the reference signal and the main channel response, and removing the reconstructed signal from the reception signal; and
outputting the reception signal after removing of the reconstructed signal,
wherein the reconstructed signal comprises interference waves, such that the interference waves are removed from the reception signal that is output.

12. A non-transitory storing medium that stores a signal processing program causing a computer to execute:
a reception step of receiving a reflection signal of a chirped pulse transmitted from a radar, wherein the reflection signal is reflected by an object;
an extraction step of performing deconvolution on a cross-correlation function of a reference signal and a reception signal, and an autocorrelation function of the reference signal, and extracting a channel response to the reference signal;
a second extraction step of extracting a main channel response associated with the reference signal from the channel response;
a removal step of reconstructing a signal by performing convolution on the reference signal and the main channel response, and removing the reconstructed signal from the reception signal; and
an output step of outputting the reception signal after removing of the reconstructed signal,
wherein the reconstructed signal comprises interference waves, such that the interference waves are removed from the reception signal that is output.

* * * * *